United States Patent
Nagao

(10) Patent No.: US 8,643,735 B2
(45) Date of Patent: Feb. 4, 2014

(54) TRANSMISSION APPARATUS, METHOD, AND PROGRAM

(75) Inventor: Kenichiro Nagao, Tokyo (JP)

(73) Assignee: Sony Corporation, Tokyo (JP)

(*) Notice: Subject to any disclaimer, the term of this patent is extended or adjusted under 35 U.S.C. 154(b) by 405 days.

(21) Appl. No.: 13/045,747

(22) Filed: Mar. 11, 2011

(65) Prior Publication Data

US 2011/0242337 A1 Oct. 6, 2011

(30) Foreign Application Priority Data

Mar. 30, 2010 (JP) ................................. 2010-079188

(51) Int. Cl.
*H04N 5/232* (2006.01)
*H04N 7/14* (2006.01)

(52) U.S. Cl.
USPC ........ 348/211.1; 348/14.12; 396/56; 725/105

(58) Field of Classification Search
USPC .......... 348/14.01, 14.02, 14.04, 14.05, 211.1, 348/E7.07, E7.071, E7.072, E7.081; 396/56; 725/105
See application file for complete search history.

(56) References Cited

U.S. PATENT DOCUMENTS

| | | | | |
|---|---|---|---|---|
| 4,985,784 A | * | 1/1991 | Tsuboi et al. | 386/294 |
| 7,050,202 B1 | * | 5/2006 | Nishida | 358/296 |
| 7,724,819 B2 | * | 5/2010 | Ishikawa | 375/240.03 |
| 7,730,240 B2 | * | 6/2010 | Albers | 710/60 |
| 2008/0054285 A1 | * | 3/2008 | Park | 257/98 |

FOREIGN PATENT DOCUMENTS

JP 2008-102845 5/2008

OTHER PUBLICATIONS

U.S. Appl. No. 13/027,578, filed Feb. 15, 2011, Nagao.

* cited by examiner

*Primary Examiner* — Hung Lam
(74) *Attorney, Agent, or Firm* — Oblon, Spivak, McClelland, Maier & Neustadt, L.L.P.

(57) ABSTRACT

A transmission apparatus includes: selection means for selecting transmission data to be transmitted to a destination apparatus; setting means for setting a transmission target period during which the selected transmission data is transmitted; control means for resizing the transmission data in such a way that the size thereof becomes smaller than or equal to a total transfer data size of the transmission data, the total transfer data size determined based on the transmission target period; display control means for controlling display of transmission information on the transmission data resized by the control means on a screen; and transmission means for transmitting the transmission data resized by the control means to the destination apparatus.

13 Claims, 16 Drawing Sheets

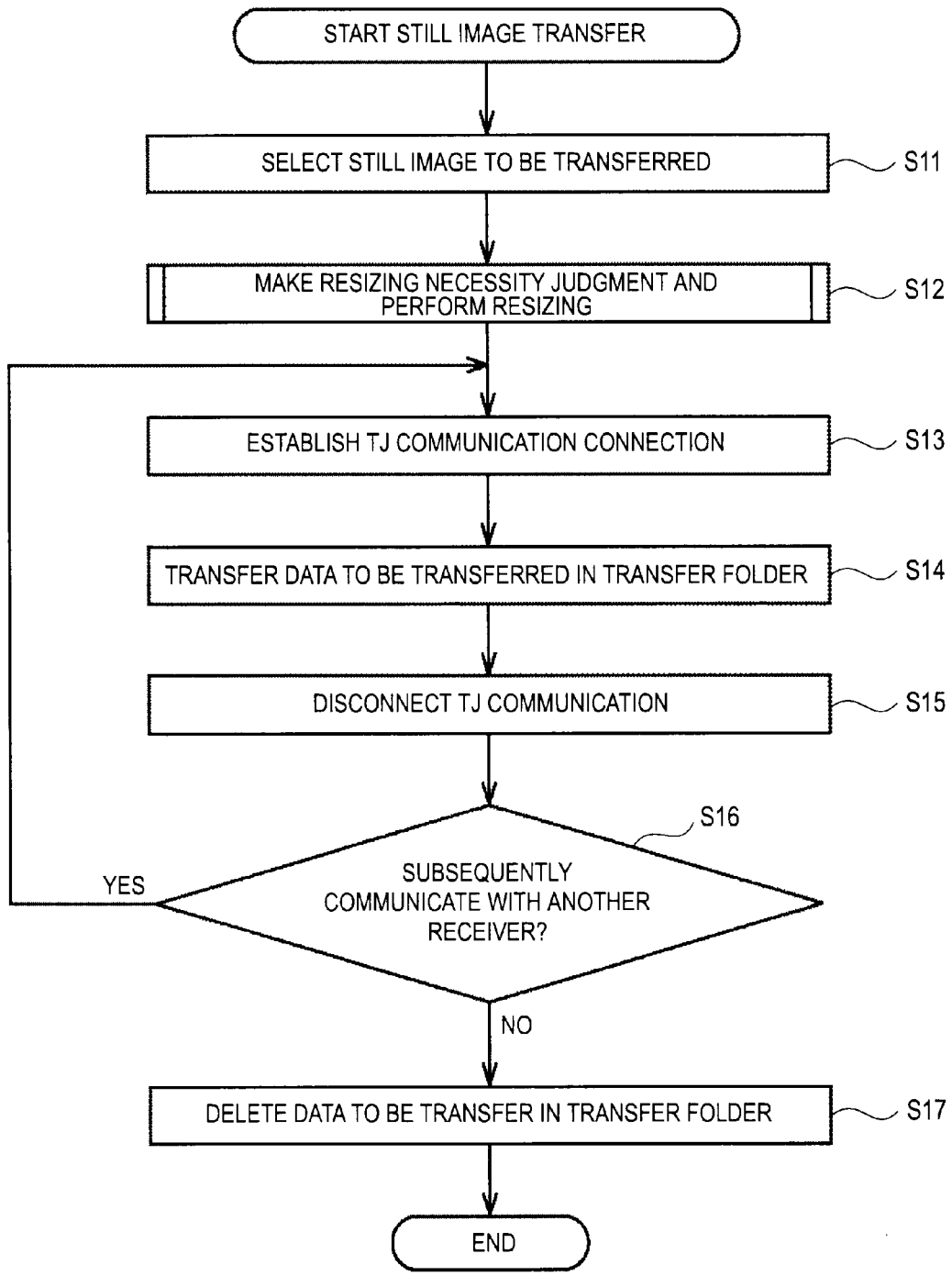

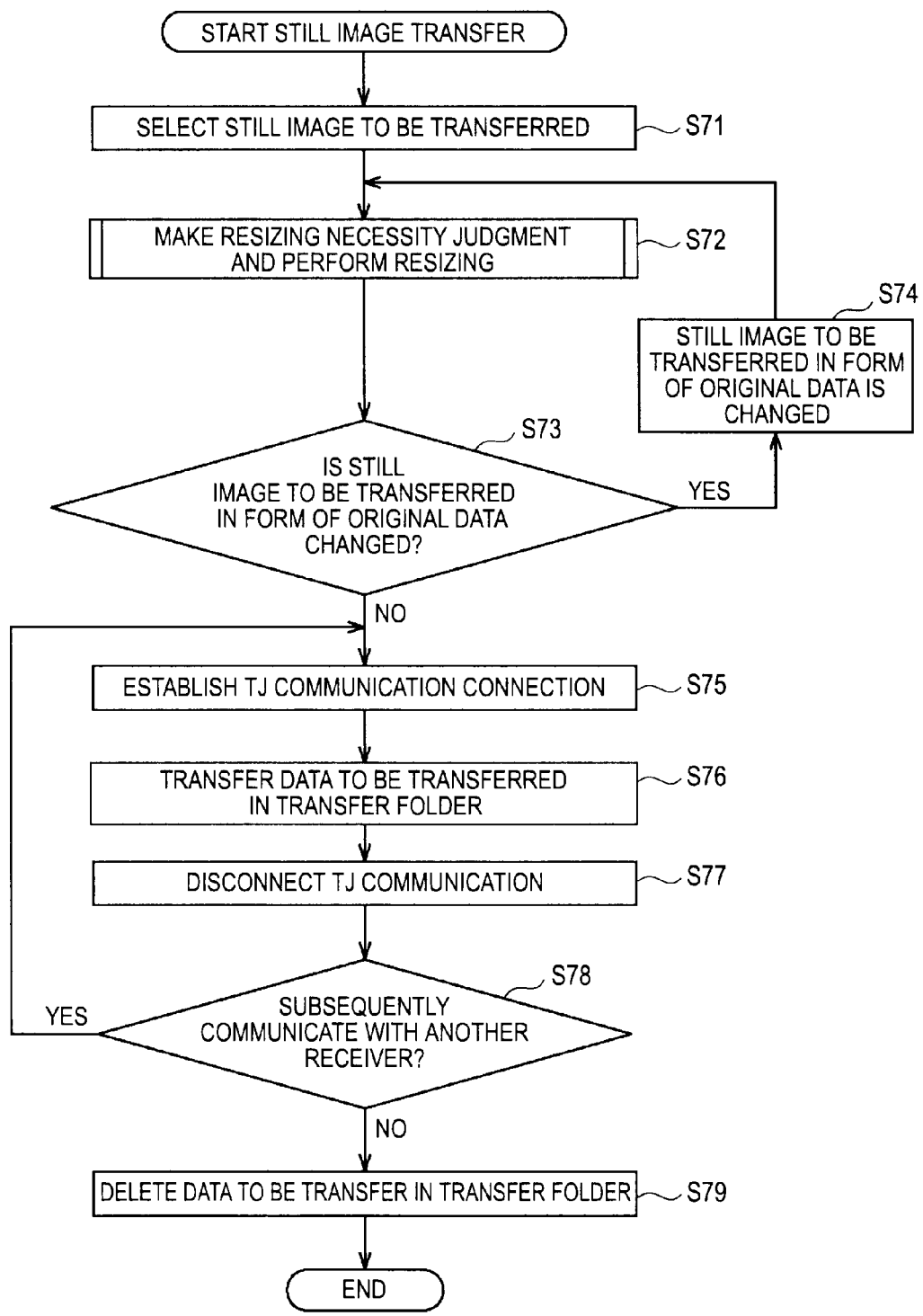

TRANSMISSION APPARATUS, METHOD, AND PROGRAM

BACKGROUND OF THE INVENTION

1. Field of the Invention

The present invention relates to a transmission apparatus, method, and program, particularly to a transmission apparatus, method, and program capable of improving user convenience in transmitting transmission data.

2. Description of the Related Art

In recent years, the number of recording pixels and hence the size of captured still image data tend to increase as the performance of a digital still camera and other imaging apparatus improves.

Further, a still image captured with a digital still camera can be transferred to other apparatus through wireless communication (see JP-A-2008-102845, for example).

SUMMARY OF THE INVENTION

When a still image having a large size is transferred between apparatus, transferring original data on a recorded still image takes a long transfer period, which compromises user convenience.

In particular, when a still image is transferred through near field communication, it is necessary not only to bring two apparatus involved in the transfer close to each other but also to maintain the state in which the two apparatus are brought close to each other while the communication is established. To this end, the transfer period in near field communication is desirably short, and the transfer period needs to be shortened.

Thus, it is desirable to reduce a transmission data transmission period when a still image or any other transmission data is transmitted through near field communication in order to improve user convenience.

A transmission apparatus according to an embodiment of the invention includes selection means for selecting transmission data to be transmitted to a destination apparatus, setting means for setting a transmission target period during which the selected transmission data is transmitted, control means for resizing the transmission data in such a way that the size thereof becomes smaller than or equal to a total transfer data size of the transmission data, the total transfer data size determined based on the transmission target period, display control means for controlling display of transmission information on the transmission data resized by the control means on a screen, and transmission means for transmitting the transmission data resized by the control means to the destination apparatus.

The transmission apparatus may further include determination means for determining a target data size to which each set of data contained in the transmission data is resized based on the total transfer data size. In this case, the control means resizes original data in the transmission data that is greater than the determined target data size in such a way that the resized data size becomes smaller than or equal to the target data size, the display control means displays the following information as the transmission information on the screen: information on original data in the transmission data that is smaller than or equal to the determined target data size and information on the resized data obtained by the resizing, and the transmission means transmits the resized data obtained by the resizing along with the original data in the transmission data that is smaller than or equal to the determined target data size to the destination apparatus.

The display control means may display, as the transmission information, transmission images corresponding to transmission data to be transmitted in the form of original data and transmission data to be transmitted in the form of resized data on the screen. The selection means may select the transmission data not to be resized but to be transmitted in the form of original data from original data in the transmission data that are greater than the target data size based on user's instruction performed on the transmission images displayed on the screen. The determination means may correct the target data size based on the data size of original data of the selected transmission data. The control means may resize original data in the transmission data that are greater than the target data size corrected based on the data size of the original data of the selected transmission data in such a way that the data sizes of the original data become smaller than or equal to the corrected target data size.

The transmission means, when being ready for near field communication with the destination apparatus, may transmit the transmission data to the destination apparatus through the near field communication.

The display control means may display a message on the screen while the control means is performing the resizing, the massage indicating that transmission preparation is in progress.

The display control means may display a message on the screen when the control means completes the resizing and the transmission preparation is made, the message prompting the user to bring the transmission apparatus close to the destination apparatus so that the near field communication is established.

The display control means may display a message on the screen when the transmission means starts the near field communication, the message indicating that the transmission is being performed.

The display control means may display a message on the screen when the transmission means completes the near field communication, the message indicating that the transmission is completed.

A transmission method used with a transmission apparatus according to another embodiment of the invention includes the steps of selecting transmission data to be transmitted to a destination apparatus, setting a transmission target period during which the selected transmission data is transmitted, resizing the transmission data in such a way that the size thereof becomes smaller than or equal to a total transfer data size of the transmission data, the total transfer data size determined based on the transmission target period, controlling display of transmission information on the resized transmission data on a screen, and transmitting the resized transmission data to the destination apparatus.

A program according to another embodiment of the invention instructs a computer to function as selection means for selecting transmission data to be transmitted to a destination apparatus, setting means for setting a transmission target period during which the selected transmission data is transmitted, control means for resizing the transmission data in such a way that the size thereof becomes smaller than or equal to a total transfer data size of the transmission data, the total transfer data size determined based on the transmission target period, display control means for controlling display of transmission information on the transmission data resized by the control means on a screen, and transmission means for transmitting the transmission data resized by the control means to the destination apparatus.

In the embodiments of the invention, transmission data to be transmitted to a destination apparatus is selected; a transmission target period during which the selected transmission data is transmitted is set; the transmission data is resized in such a way that the size thereof becomes smaller than or equal to a total transfer data size of the transmission data, the total transfer data size determined based on the transmission target period; display of transmission information on the resized transmission data on a screen is controlled, and the resized transmission data is transmitted to the destination apparatus.

As described above, according to the embodiments of the invention, user convenience in transmitting transmission data can be improved.

BRIEF DESCRIPTION OF THE DRAWINGS

FIG. 5 is a flowchart for describing still image transfer performed by the digital still camera shown in FIG. 4;

FIG. 15 is a flowchart for describing still image transfer performed by the digital still camera shown in FIG. 14;

DESCRIPTION OF THE PREFERRED EMBODIMENTS

Modes for carrying out the invention (hereinafter referred to as embodiments) will be described below. The description will be made in the following order.

1. First Embodiment
2. Second Embodiment
3. Variations

<1. First Embodiment>

A first embodiment of the invention will first be described with reference to FIGS. 1 to 13.

[Summary of Near Field Communication Performed Between Apparatus]

Figure 1:
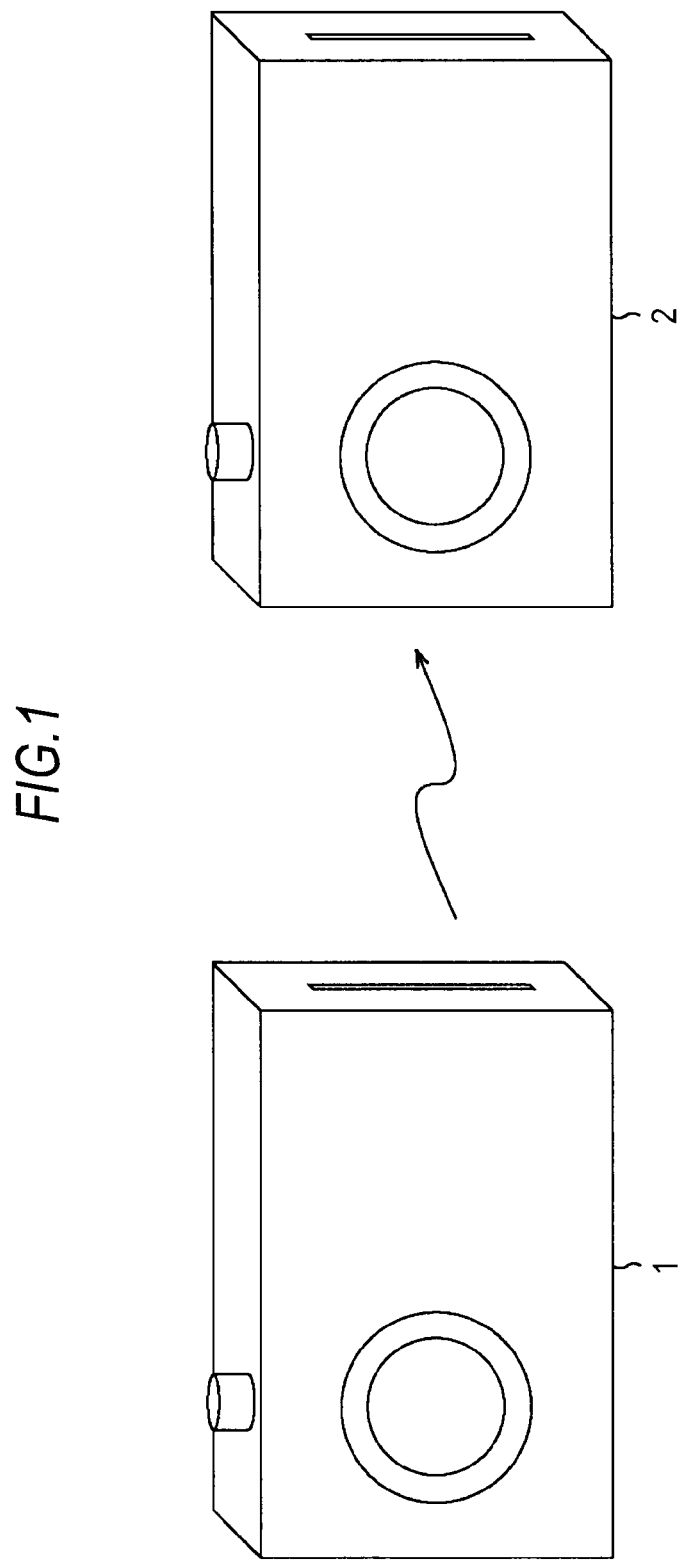
FIG. 1 describes a summary of near field communication performed between digital still cameras.

FIG. 1 describes a summary of near field communication performed between two digital still cameras.

A digital still camera 1 captures an image of a subject in response to user's operation and stores data on the captured image of the subject (hereinafter also referred to as a still image). The digital still camera 1 includes a communication section (a TJ communication section 13 in FIG. 2, which will be described later) for communicating with other apparatus, and so does a digital still camera 2. Each of the digital still cameras 1 and 2 can transfer a stored still image by communicating with each other through near field communication. The digital still camera 2 receives and stores the still image transferred from the digital still camera 1.

Specifically, the digital still camera 1, when transferring a stored still image, determines a target data size of the still image to be transferred based on predetermined conditions before initiating near field communication and performs resizing to produce data to be transferred (hereinafter referred to as transfer data). The conditions used to determine the target data size include a communication period and a communication band, the data size of each still image to be transferred, and the number of still images to be transferred. The target data size of each still image to be transferred is determined based on the conditions described above.

The digital still camera 1, after producing transfer data, initiates near field communication with the digital still camera 2 and transfers the produced transfer data. Determining the target data size of each still image to be transferred and performing resizing based on the target data size before transfer as described above allows the near field communication to be completed in a fixed period irrespective of the data size of each still image to be transferred and the number of still images to be transferred.

The near field communication performed between the digital still cameras 1 and 2 can be wireless communication based on TransferJet (hereinafter referred to as TJ communication) or a variety of other communication methods. The following description will be made with reference to TJ communication as an example of the near field communication. The TJ communication will be described in detail in "3. Variations," which will be described later.

The present embodiment will be described by assuming that transmission of a still image captured with the digital still camera 1 and stored therein to the digital still camera 2 or any other receiver is referred to as transfer. It is, however, noted that the word "transfer" includes the meaning of "transmission."

[Exemplary Exterior Configuration of Digital Still Camera]

Figure 2:
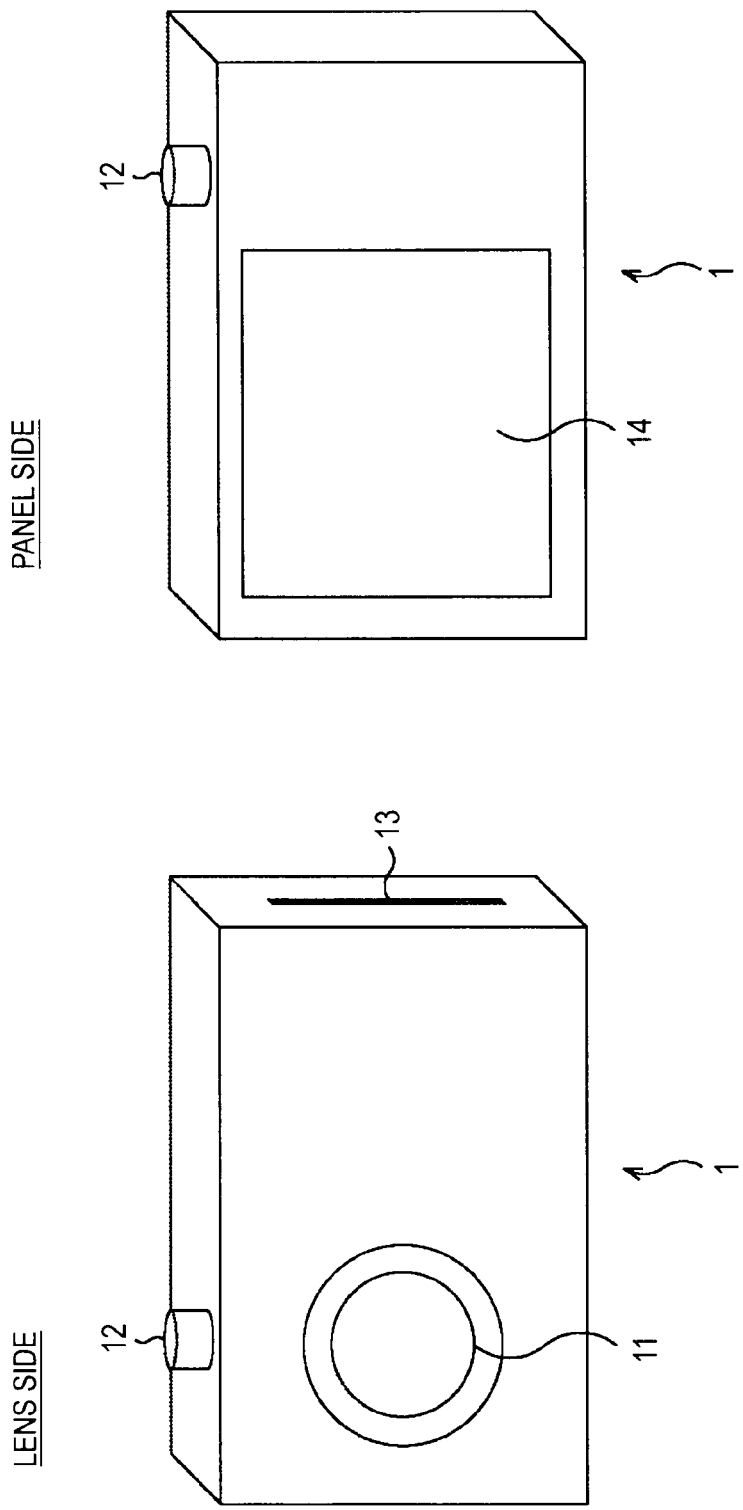
FIG. 2 shows an exemplary exterior configuration of an embodiment of a digital still camera.

FIG. 2 is a front/rear view showing an exemplary exterior configuration of an embodiment of the digital still camera 1 to which the invention is applied.

The left portion of FIG. 2 shows the digital still camera 1 with the front side thereof, that is, a lens side facing a subject, facing the reader. On the other hand, the right portion of FIG. 2 shows the digital still camera 1 with the rear side thereof, that is, a panel side facing a user of the digital still camera 1, facing the reader.

On the left, viewed from the reader, of the front side of the digital still camera 1 shown in the left portion of FIG. 2 is provided a lens section 11. The lens section 11 is formed of a lens that collects light from a subject, a focus lens for adjusting focus, a diaphragm and other optical systems, and other components (neither of the components is shown). The lens section 11 comes out of a housing of the digital still camera 1 when the digital still camera 1 is turned on, whereas retracting into the housing of the digital still camera 1 when the digital still camera 1 is turned off. In FIG. 2, the lens section 11 is retracted in the housing of the digital still camera 1.

On the left, viewed from the front side, of an upper portion of the digital still camera 1 is provided a shutter button 12 operated when a captured image is recorded.

On the right side of the digital still camera 1 is provided a TJ communication section 13 having a built-in chip for performing TJ communication with other apparatus having a TJ communication reader function. The TJ communication section 13, when it is ready for near field communication with other apparatus, transmits and receives data in a noncontact manner by using a radio wave having a predetermined frequency (center frequency: 4.48-GHz band).

On the rear side of the digital still camera 1 shown in the right portion of FIG. 2 is provided a display section 14 formed, for example, of a liquid crystal panel and an operation button (not shown) operated, for example, to move a cursor for selecting an item on a menu screen displayed in the display section 14 or finalize a selected item. The display section 14 is used not only as a viewfinder in the digital still camera 1 but also as a monitor for reproducing a recorded still image and displaying the menu screen for making a variety of settings. The display section 14 can alternatively be formed of a tough panel display. In this case, a variety of keys are displayed as software keys in the display section 14.

[Exemplary Interior Configuration of Digital Still Camera]

Figure 3:
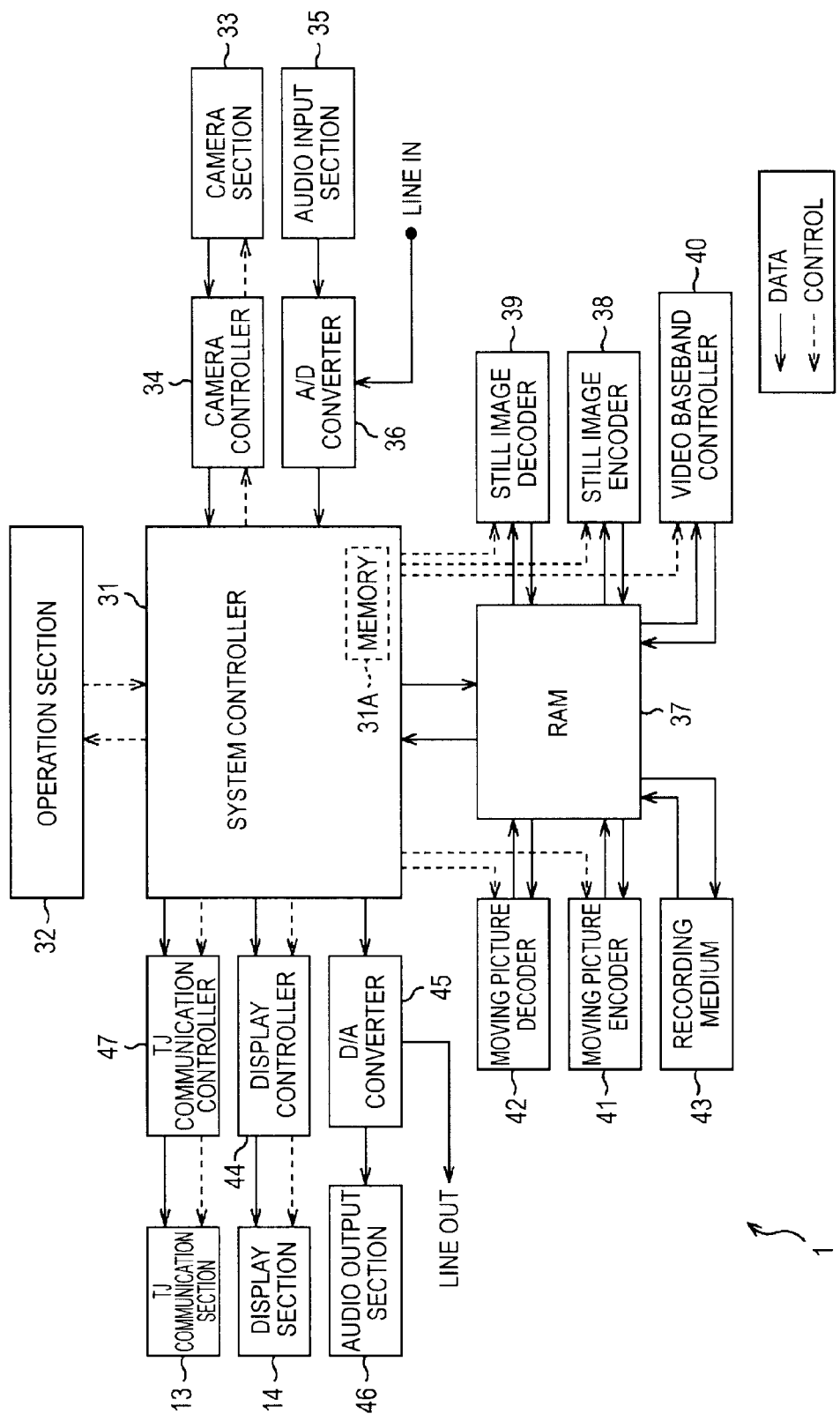
FIG. 3 shows an exemplary interior configuration of the digital still camera.

FIG. 3 shows an exemplary interior configuration of the digital still camera 1 shown in FIG. 2.

The digital still camera 1 further includes, in addition to the TJ communication section 13 and the display section 14 shown in FIG. 2, a system controller 31, an operation section 32, a camera section 33, a camera controller 34, an audio input section 35, an A/D converter 36, a RAM 37, a still image encoder 38, a still image decoder 39, a video baseband controller 40, a moving picture encoder 41, a moving picture decoder 42, a recording medium 43, a display controller 44, a D/A converter 45, an audio output section 46, and a TJ communication controller 47.

In FIG. 3, the lens section 11 and the shutter button 12 shown in FIG. 2 are omitted. FIG. 3 also shows lines connecting the blocks in the figure. Among the lines, each solid line represents data flow, and each dotted line represents control signal flow.

The system controller 31 is formed, for example, of a CPU (Central Processing Unit), a ROM (Read Only Memory), and a RAM (Random Access Memory) (neither of the components is shown) connected with respect to each other. In the system controller 31, the CPU uses the RAM as a work memory and executes a program recorded in advance in the ROM to control the action of each of the sections in the digital still camera 1 and carry out a variety of processes according to signals from the operation section 32. The system controller 31 further includes a built-in memory 31A that can store a variety of data.

The operation section 32 is operated by a user and supplies a signal according to the operation to the system controller 31. The operation section 32 corresponds not only to the shutter button 12 shown in FIG. 2 but also to the operation button, a power switch, a zoom button, and other components (not shown).

The camera section 33 includes an optical system including a lens unit, a diaphragm mechanism, a focus mechanism, and a zoom mechanism and uses a CCD (Charge Coupled Device) sensor or a CMOS (Complementary Metal Oxide Semiconductor) sensor as an imaging device. The camera section 33 operates under the control of the camera controller 34, specifically, receives light originating from a subject and incident through the optical system described above, converts the light into an electric signal, and supplies an analog image signal as an electric signal according to the amount of received light to the camera controller 34.

The camera controller 34 converts the analog image signal into a digital signal, performs digital signal processing, such as noise reduction, on image data represented by the digital signal, and supplies the processed signal to the system controller 31.

The audio input section 35, which is, for example, a microphone, collects external audio, converts the audio into an analog audio signal, and supplies it to the A/D converter 36. The A/D converter 36 converts the analog audio signal supplied from the audio input section 35 or an external source (Line in) into digital audio data and supplied it to the system controller 31.

The system controller 31 temporarily stores the image data supplied from the camera controller 34 and the audio data supplied from the A/D converter 36 in the RAM 37.

The RAM 37 is, for example, an SDRAM (Synchronous Dynamic Random Access Memory) and stores, when an image is recorded, image data and audio data supplied from the system controller 31.

When a still image is recorded, the still image encoder 38 compresses image data supplied from the RAM 37 based, for example, on a JPEG (Joint Photographic Experts group) scheme and supplies the resultant compressed image data (compressed still image data) to the RAM 37. The system controller 31 adds auxiliary information to the compressed image data stored in the RAM 37, writes the image data with the auxiliary information back to the RAM 37, and then supplies them as a JPEG file to the recording medium 43, where the JPEG file is recorded.

The recording medium 43 can, for example, be a removable semiconductor memory or a fixed hard disk that allows stored information to be rewritten. The recording medium 43 is not limited thereto but can be a Blu-ray Disc® or any other optical disk.

On the other hand, when a still image is reproduced, the system controller 31 separates a JPEG file read from the recording medium 43 and then stored in the RAM 37 into compressed image data (compressed still image data) and auxiliary information and supplies them to the still image decoder 39. The still image decoder 39 decodes the compressed image data supplied from the RAM 37 based on a decoding scheme corresponding to a compression encoding scheme used in the still image encoder 38. For example, when the still image encoder 38 performs compression encoding based on a JPEG scheme, the still image decoder 39 performs decoding based on the JPEG scheme in correspondence with the still image encoder 38. The decoded image data (still image data) is outputted to the RAM 37. The display controller 44 converts the image data supplied from the RAM 37 via the system controller 31 into a signal in a format displayable in the display section 14 and supplies the resultant signal to the display section 14, where the signal is displayed.

The video baseband controller 40 resizes the image data decoded by the still image decoder 39 and then stored in the RAM 37. The resized image data is temporarily stored in the RAM 37 and compressed by the still image encoder 38, for example, based on the JPEG scheme again, and auxiliary information is added to the image data. The image data with the auxiliary information is then written back to the RAM 37 and recorded on the recording medium 43.

When moving pictures are recorded, the moving picture encoder 41 compresses image data supplied from the RAM 37 based on a predetermined compression encoding scheme and supplies the resultant compressed image data (compressed moving picture data) to the RAM 37. An audio encoder (not shown) compresses audio data supplied from the RAM 37 based on a predetermined compression encoding scheme and supplies the resultant compressed audio data to the RAM 37. The system controller reads the compressed image data having undergone the compression encoding in the moving picture encoder 41 and the compressed audio data having undergone the compression encoding in the audio encoder, multiplexes the thus read data by using a predetermined method to produce a data stream, writes the data stream back to the RAM 37, and then records it on the recording medium 43. The multiplexing scheme is, for example, a MPEG2 (Moving Picture Experts Group 2) system.

On the other hand, when moving pictures are reproduced, the system controller 31 separates a data stream supplied from the recording medium 43 via the RAM 37 into compressed image data (compressed moving picture data) and compressed audio data and supplies them via the RAM 37 to the moving picture decoder 42 and an audio decoder (not shown). The image data (moving picture data) and the audio data decompressed by the decoders are temporarily stored in the RAM 37. At the same time, the image data is supplied to the display controller 44, and the audio data is supplied to the D/A (Digital/Analog) converter 45.

The D/A converter 45 converts the digital audio data into an analog audio signal and outputs it to the audio output section 46 or an external apparatus (Line out). The audio output section 46, which is, for example, a loud speaker, outputs the audio signal supplied from the D/A converter 45 in synchronization with the image data displayed in the display section 14 under the control of the display controller 44.

To transfer a still image through TJ communication, the system controller 31 reads image data (a JPEG file, for example) recorded on the recording medium 43 into the RAM 37 and then supplies transfer data obtained by resizing the image data in the video baseband controller 40 to the TJ communication controller 47. The TJ communication controller 47 controls the TJ communication section 13 to transfer the transfer data supplied from the system controller 31 to other apparatus having a TJ communication reader function. The digital still camera 1 is configured as described above.

The program executed by the CPU, which forms the system controller 31, is installed or stored in advance in the ROM or any other component. The program can alternatively be recorded on the recording medium 43 and provided as a package medium to the user. In this case, the program stored on the recording medium 43 is read and stored in the ROM, which forms the system controller 31. The program can thus be installed in the digital still camera 1. Still alternatively, the program executed by the CPU can be directly downloaded from a download site to the digital still camera 1 shown in FIG. 3 or downloaded by using a personal computer (not shown), supplied to the digital still camera 1 shown in FIG. 3, and stored in the ROM so that the program is installed in the digital still camera 1.

[Exemplary Functional Configuration of Digital Still Camera]

Figure 4:
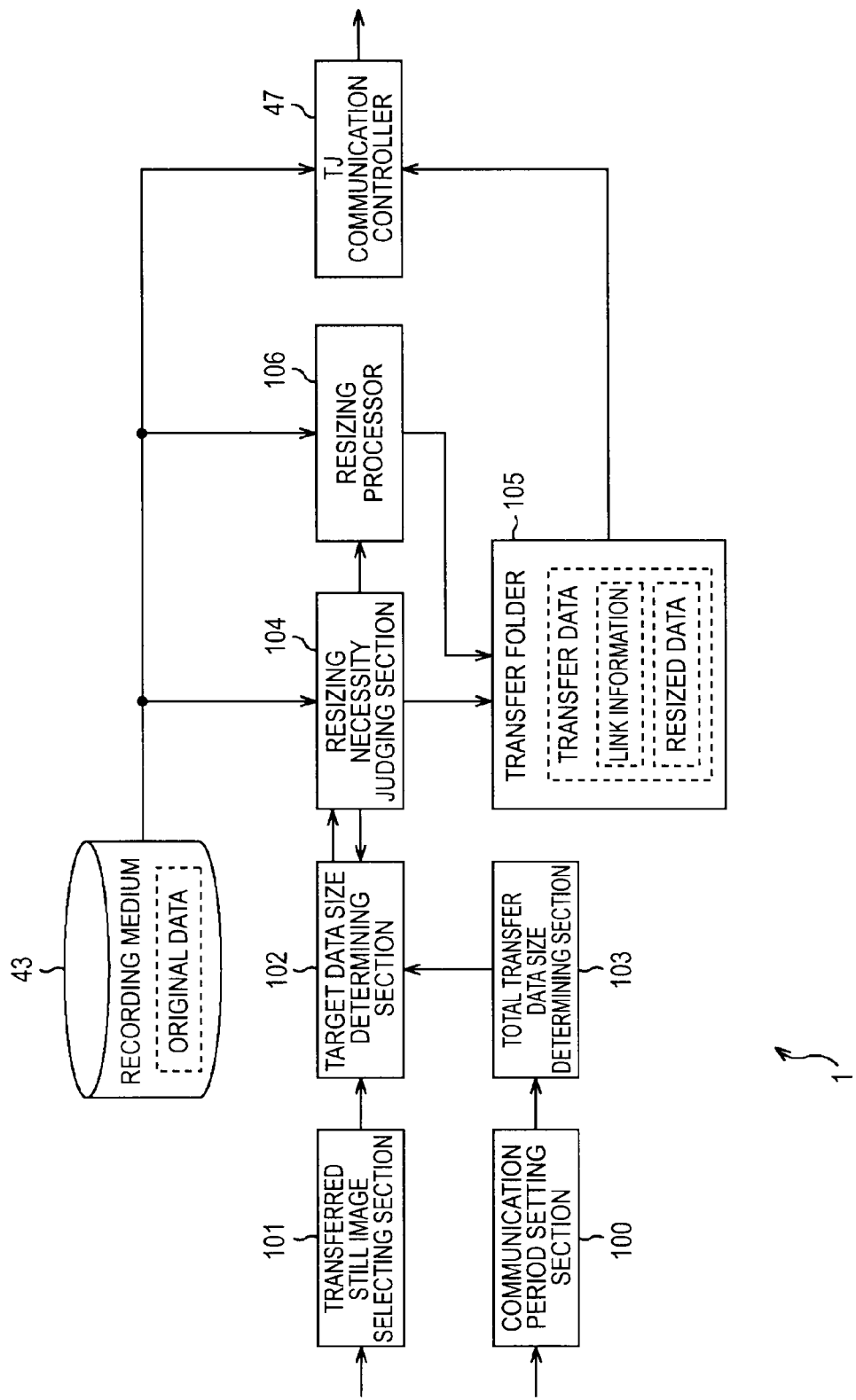
FIG. 4 shows an exemplary functional configuration of the digital still camera.

FIG. 4 is a block diagram showing an exemplary functional configuration of the digital still camera 1 shown in FIG. 3.

In the present embodiment, since the digital still camera 1 has the hardware configuration shown in FIG. 3 described above, a communication period setting section 100, a transferred still image selecting section 101, a target data size determining section 102, a total transfer data size determining section 103, and a resizing necessity judging section 104 in FIG. 4 are achieved by a program executed by the CPU in the system controller 31.

In FIG. 4, a resizing processor 106 corresponds, for example, to the video baseband controller 40 in FIG. 3, and a transfer folder 105 corresponds, for example, to a transfer data storing area in the RAM (not shown) or the memory 31A built in the system controller 31, the RAM 37, or the recording medium 43 shown in FIG. 3, or any other storage device. In FIG. 4, the same portions as those in FIG. 3 have the same reference characters, and portions where the same processes are carried out will not be repeatedly described.

In the following description, resized still image data is also referred to as resized data, and non-resized still image data is also referred to as original data.

The transferred still image selecting section 101 receives a signal according to user's operation from the operation section 32. The transferred still image selecting section 101 selects a still image to be transferred in accordance with the user's operation and supplies the selection result to the target data size determining section 102.

The signal according to the user's operation supplied from the operation section 32 is also supplied to the communication period setting section 100. The communication period setting section 100 sets a communication period, which is a period during which the transfer data described above is transferred, in accordance with the user's operation. The thus set communication period is supplied to the total transfer data size determining section 103. In other words, it can also be said that the communication period is a transmission target period selected by the user. The communication period set by the communication period setting section 100 is not necessarily selected by the user but can, for example, be a predetermined communication period having being set in advance.

The total transfer data size determining section 103 determines the total transfer data size of the data to be transferred to a destination receiver based on the communication period set by the communication period setting section 100 and supplies the result to the target data size determining section 102. The total transfer data size is determined based not only on the set communication period (transmission target period) but also, for example, on the communication band. The determination of the total transfer data size will be described later in detail.

The target data size determining section 102 receives the selected still image to be transferred from the transferred still image selecting section 101 and the total transfer data size from the total transfer data size determining section 103. The target data size determining section 102 determines the target data size from the number of still images to be transferred and the total transfer data size and supplies the target data size to the resizing necessity judging section 104.

The resizing necessity judging section 104 acquires the data size of a still image being processed (original data) from the recording medium 43 and compares the data size of the still image with the target data size supplied from the target data size determining section 102 to judge whether or not resizing is necessary. The resizing necessity judging section 104 supplies the resizing necessity judgment result to the target data size determining section 102 and the resizing processor 106.

The target data size determining section 102 uses a still image data size judged to be smaller than the target data size to correct the target data size based on the resizing necessity judgment result supplied from the resizing necessity judging section 104 and supplies the corrected target data size to the resizing necessity judging section 104.

The resizing necessity judging section 104 receives the corrected target data size from the target data size determining section 102. The resizing necessity judging section 104 compares a still image data size with the corrected target data size to judge again whether or not resizing is necessary.

When the still image data size has been judged to be smaller than or equal to the corrected target data size, the resizing necessity judging section 104 allows the transfer folder 105 to hold link information on the still image being processed (original data). The link information is not the still image data itself but represents the location where original data on the still image is stored. The link information held in the transfer folder 105 therefore identifies original data on the still image.

On the other hand, when the still image data size has been judged to be greater than the corrected target data size, the resizing necessity judging section 104 supplies to the resizing processor 106 the judgment result indicating that the still image being processed needs to be resized.

The resizing processor 106 acquires from the recording medium 43 original data on the still image being processed that has been judged by the resizing necessity judging section 104 to be resized and resizes the data size of the acquired still image to the corrected target data size. When the still image is a JPEG-compressed image, the resizing is performed, for example, by temporarily converting the image into a bit-mapped image and then compressing the image again based on the JPEG scheme so that the compressed image has the corrected target data size. The resizing can alternatively be performed by using other known techniques.

In other words, it can also be said that the resizing processor 106 so resizes the still image to be transferred that the data size thereof becomes smaller than or equal to the total transfer data size determined based on the communication period (transmission target period).

In the description of the present embodiment, the resizing processor 106 so resizes an acquired still image that the data size thereof becomes a corrected target data size, but in practice, the resizing may be so performed that the data size of a resized still image becomes smaller than or equal to the target data size. That is, when resizing is so performed that the data size of a resized still image becomes smaller than or equal to the target data size, the data can be transferred within a communication period (transmission target period) having been set.

The still image being processed that has been resized to have the corrected target data size (resized data) is supplied to the transfer folder 105 and held there.

The transfer folder 105 holds transfer data to be transferred to a destination receiver. The transfer data held in the transfer folder 105 is formed of a resized still image (resized data) that has been resized because the resizing necessity judging section 104 has judged that resizing is necessary and link information on a still image that has not been resized because the resizing necessity judging section 104 has judged that resizing is unnecessary.

The TJ communication controller 47 acquires the transfer data held in the transfer folder 105 and acquires original data on the still image corresponding to the acquired link information from the recording medium 43. That is, the TJ communication controller 47 acquires the resized data on the still image having been judged by the resizing necessity judging section 104 to be resized and original data on the still image having been judged not to be resized.

The TJ communication controller 47, when it is ready for TJ communication with a destination receiver, controls the TJ communication section 13 to transfer the resized data and the original data corresponding to the link information to the destination receiver.

The digital still camera 1 is configured as described above.

[Still Image Transfer]

Still image transfer performed by the digital still camera 1 shown in FIG. 4 will next be described with reference to the flowchart of FIG. 5.

The processes in the flowchart of FIG. 5 are initiated when user's operation issues an instruction to perform TJ transfer.

In step S11, the transferred still image selecting section 101 selects a still image to be transferred in accordance with user's operation.

Figure 6A:
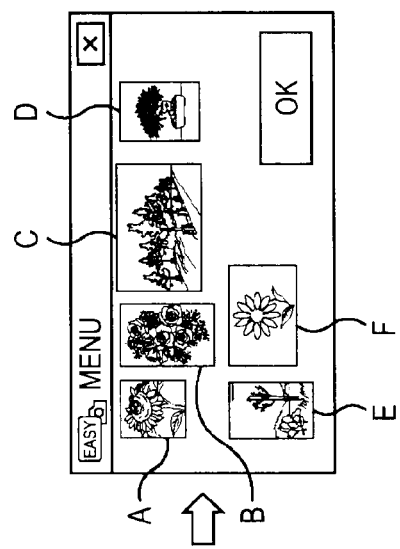
FIGS. 6A to 6C diagrammatically show a series of screens for selecting an image to be transferred.
Figure 6B:
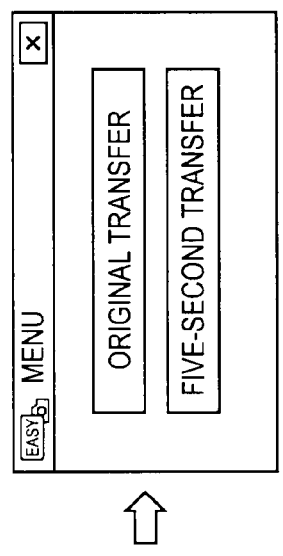
Figure 6C:
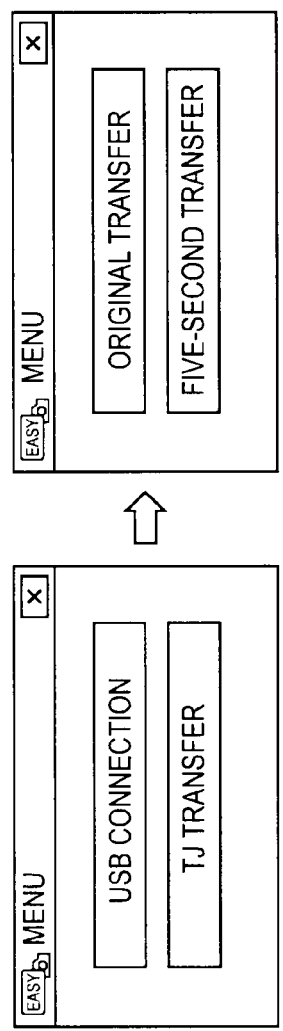

FIGS. 6A to 6C diagrammatically show a series of screens for selecting a still image to be transferred through TJ communication. The screens shown in FIGS. 6A to 6C are displayed in the display section 14 under the control of the display controller 44. The user operates the operation section 32 to select from a variety of buttons and images displayed on the screens.

The screen shown in FIG. 6A allows the user to choose a method for transferring a still image from "USB connection" and "TJ transfer." To initiate still image transfer, the display section 14 first displays the screen shown in FIG. 6A. When the user chooses "TJ transfer" on the screen shown in FIG. 6A, the screen shown in FIG. 6B is displayed and prompts the user to choose from "original transfer" and "five-second transfer," either of which is a "TJ transfer" method for transferring a still image.

The "original transfer" is a transfer mode for transferring original data on a still image and allows original data having a large data size to be transferred although it takes long. On the other hand, the "five-second transfer" is a transfer mode for transferring a still image having any data size in a fixed period (five seconds in this example) and allows the transfer to be completed in a fixed period although there is a resized still image having a small data size.

When the user chooses the "five-second transfer" on the screen shown in FIG. 6B, the screen shown in FIG. 6C is displayed, and the screen prompts the user to select a still image to be transferred from the still images recorded on the recording medium 43. To allow the user to select a still image, for example, thumbnail images of the still images recorded on the recording medium 43 or a list of the still images is displayed, and the user selects a desired still image from the thumbnail images or the list. Other known methods for selecting a still image may alternatively be used. When the user selects from still images A to F to be transferred and presses an OK button on the screen in FIG. 6C, the selected one of the still image A to F is transferred through the five-second TJ transfer.

Referring back to the flowchart of FIG. 5, in step S12, the target data size determining section 102 makes resizing necessity judgment, and the resizing processor 106 performs resizing.

Figure 7A:
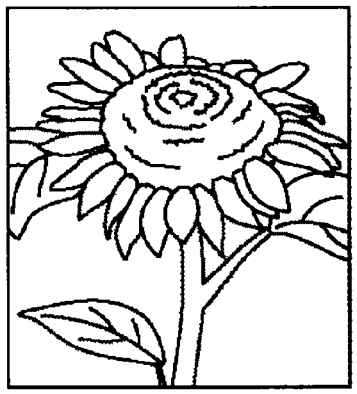
FIGS. 7A and 7B describe a summary of resizing necessity judgment and resizing.
Figure 7B:
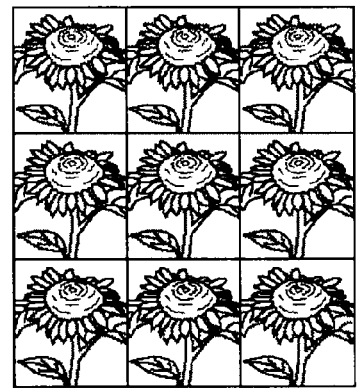

The resizing necessity judgment and the resizing will be summarized with reference to FIGS. 7A and 7B.

For example, when only a single still image shown in FIG. 7A is transferred, large-size original data can be transferred. However, nine still images each having the same large size may not be transferred in the period in which a single image having the large size is transferred. In this case, the original data can be transferred in a transfer period corresponding to the nine images, but the transfer period becomes inevitably long.

On the other hand, as shown in FIG. 7B, nine (three by three) still images each having a smaller data size can be transferred in the period in which the single still image shown in FIG. 7A is transferred, even when the number of still images to be transferred is nine.

In the resizing necessity judgment and the resizing (processes in step S12 in FIG. 5), the data size of a still image to be transferred is resized to be smaller in order to transfer the still image in a predetermined fixed period (five seconds, for example), and the resultant transfer data is held in the transfer folder 105. The resizing necessity judgment is made and the resizing is performed based on predetermined conditions, which will be described later in detail with reference to the flowcharts of FIGS. 10 and 11.

Figure 8:
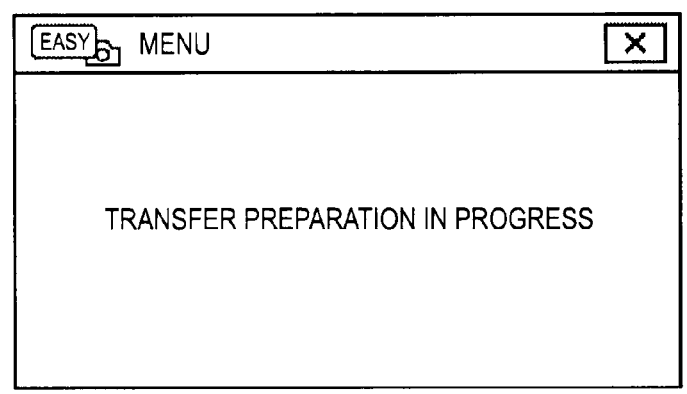
FIG. 8 diagrammatically shows a screen displayed when transfer preparation is in progress.

Since it takes a certain length of time to resize or otherwise process a still image, the display section 14 displays "transfer preparation in progress" shown in FIG. 8 or any other message under the control of the display controller 44 until the resizing necessity judgment and the resizing are completed. The resizing necessity judgment is made and the resizing is performed before the TJ communication is initiated as described above, and the resultant transfer data is held in the transfer folder 105.

It is noted that the resizing has been summarized with reference to FIGS. 7A and 7B based on the height and the width of a still image for ease of conceptual understanding of the size of the still image. In practice, the resizing is performed based on the data volume of each still image. For example, assuming that the data size transferable in five seconds through TJ communication is 270 MB, ten 27-MB still images can be transferred in the form of original data. When ninety 27-MB still images are transferred, however, it takes 45 seconds to transfer the still images in the form of original data. To transfer the still images in five seconds, the still images may be so resized that each of the still images has a data size of 3 MB.

Referring back to the flowchart of FIG. 5, the TJ communication controller 47, when it is ready for TJ communication with a destination receiver, starts establishing TJ communication connection with the destination receiver in step S13, and the transfer data in the transfer folder 105 is transferred through the TJ communication section 13 in step S14.

Since the transfer folder 105 holds link information and resized data as transfer data, the TJ communication controller 47 first reads the original data corresponding to the link information from the recording medium 43 and then transfers the original data along with the resized data.

Figure 9A:
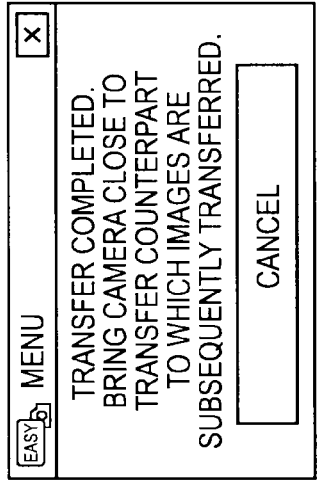
FIGS. 9A to 9C diagrammatically show a series of screens displayed when transfer is performed.
Figure 9B:
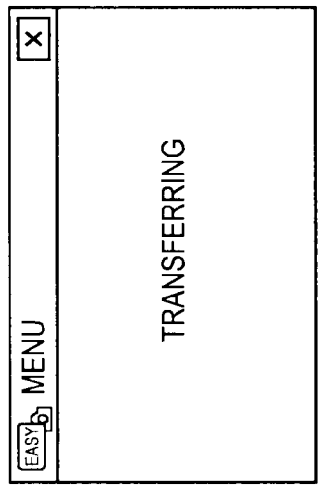
Figure 9C:
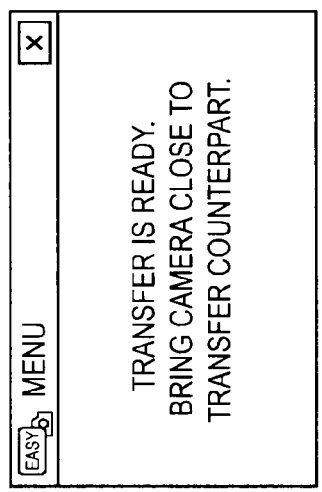

FIGS. 9A to 9C diagrammatically show a series of screens displayed when TJ transfer is performed. These screens are displayed in the display section 14 under the control of the display controller 44. For example, when the resizing necessity judgment and the resizing are completed, the display section 14 displays "Transfer is ready, and bring the camera close to a transfer counterpart" shown in FIG. 9A or any other message. The user who has read the message brings the digital still camera 1 by hand close to the digital still camera 2 or any other destination receiver. When the TJ communication connection is established and the transfer data starts being transferred (processes in steps S13 and S14), the display section 14 displays "Transferring" shown in FIG. 9B or any other message.

Referring back to the flowchart of FIG. 5, after the transfer data is transferred, the TJ communication controller 47 disconnects the TJ communication with the connected receiver in step S15. The period spent for the TJ communication is a fixed period, five seconds for example, as described above. In this way, the receiver receives and stores the transfer data from the digital still camera 1.

After the transfer data is transferred to a single receiver, it is judged in step S16 whether or not to continue communicating with another receiver and transfer another set of transfer data. For example, after the transfer data is transferred, the screen shown in FIG. 9C is displayed. The user who has read the message judges whether to continue the transfer to another receiver. To continue the transfer, the user may bring the digital still camera 1 close to the receiver. On the other hand, to terminate the transfer, the user presses a cancel button on the screen shown in FIG. 9C.

Referring back to the flowchart of FIG. 5, when it is judged that communication is subsequently established with another receiver ("Yes" in step S16), the control returns to step S13, and the processes in steps S13 to S15 are repeated. In this case, neither resizing necessity judgment is made nor is resizing performed (processes in step S12), and when the transfer date having already been held in the transfer folder 105 is ready for TJ communication with a destination receiver, the transfer data is transferred to that receiver.

On the other hand, when it is judged that no communication is subsequently established with another receiver ("No" in step S16), the transfer data held in the transfer folder 105 is deleted in step S17, and the still image transfer shown in FIG. 5 is terminated.

The digital still camera 1 shown in FIG. 4 performs still image transfer as described above.

[Details of Resizing Necessity Judgment and Resizing]

The resizing necessity judgment and the resizing corresponding to the processes in step S12 in FIG. 5 will next be described in detail with reference to the flowcharts of FIGS. 10 and 11.

In step S31, the total transfer data size determining section 103 determines a total transfer data size (D1) of data to be transferred to a destination receiver and supplies the result to the target data size determining section 102. The total transfer data size (D1) is determined, for example, from the following Equation (1).

$$D1 = \text{communication band} \times \text{communication period} \quad (1)$$

The communication band is a fixed value defined by TJ communication standards or any other predetermined standards or a value set by the user. For example, in TJ communication, since the resizing necessity judgment is made and the resizing is performed before TJ communication is established, an effective transfer rate in TJ communication typically cannot be acquired when the resizing necessity judgment is made and the resizing is performed. The total transfer data size (D1) is therefore determined based on an effective transfer rate described in TJ communication specifications. Since the effective transfer rate in an actual apparatus is guaranteed to be higher than the effective transfer rate described in the specifications, the transfer period in an actual apparatus will not be longer than the transfer period calculated from the effective transfer rate described in the specifications.

The communication period is a transfer data transfer period set by the communication period setting section 100. For example, when the user chooses the "five-second transfer" on the screen shown in FIG. 6B, the communication period is set at five seconds. The communication period (transmission target period) is selected by the user or set in advance, as described above.

Therefore, increasing the communication band and/or the communication period increases the total transfer data size accordingly.

In step S32, the target data size determining section 102 initializes the following two variables: a variable (D2) for determining an integral value of the difference between a target data size and the data size of original data on each still image to be transferred (hereinafter referred to as a data size difference integral value), and a resize count (ResizeCount)

for counting the number of still images to be resized. As a result of the initialization, D2 and ResizeCount are set at zero.

The target data size determining section 102 acquires in step S33 the number of still images to be transferred (TotalCount) from the transferred still image selecting section 101 and determines in step S34 a target data size per still image (TargetSize). The target data size (TargetSize) is determined from the following Equation (2) and, specifically, the data size of a single still image to be transferred (average data size) with respect to the total transfer target data size (D1).

$$TargetSize=D1/TotalCount \quad (2)$$

The thus determined target data size (TargetSize) is supplied to the resizing necessity judging section 104, and the control proceeds to step S35.

The resizing necessity judging section 104 initializes a still image being processed by setting it to be first transferred instep S35 and judges whether or not all the still images to be transferred have been processed as described above in step S36.

When the result of the judgment in step S36 shows that all the still images have not been processed, the resizing necessity judging section 104 acquires in step S37 the data size of original data (OriginalSize) on the still image to be transferred from the original data on the still images recorded on the recording medium 43.

In step S38, the resizing necessity judging section 104 judges whether or not the acquired data size (OriginalSize) of the still image is greater than the target data size (TargetSize).

When the result of the judgment in step S38 shows that the data size (OriginalSize) of the still image is greater than the target data size (TargetSize), the resizing necessity judging section 104 reserves in step S39 the still image being processed as an image to be resized. Information on the reservation is stored in the RAM (not shown) or the memory 31A built in the system controller 31, the RAM 37, or the recording medium 43 shown in FIG. 3, or any other storage device. The target data size determining section 102 increments the resize count (ResizeCount) by one in step S40 because the number of still images to be resized increases by one based on the resizing necessity judgment result provided from the resizing necessity judging section 104.

The resizing necessity judgment on a single still image has thus completed. Subsequently, the resizing necessity judging section 104 changes the still image being processed from the still image having undergone the resizing necessity judgment to the next still image in step S41, and the control returns to step S36.

When it is judged that all the still images have not been processed ("No" in step S36), the data size (OriginalSize) of the next still image is acquired, and it is judged whether or not the data size (OriginalSize) of the next still image is greater than the target data size (TargetSize) (steps S37 and S38).

When the result of the judgment in step S38 shows that the data size (OriginalSize) of the still image is smaller than or equal to the target data size (TargetSize), the control proceeds to step S42.

In step S42, the resizing necessity judging section 104 allows the transfer folder 105 to hold link information on the still image being processed. That is, since the still image corresponding to the link information has a data size smaller than the target data size (TargetSize), it is not necessary to reduce the data size and hence no resizing is performed. Further, the resizing necessity judging section 104 calculates the difference between the target data size (TargetSize) and the data size of original data (OriginalSize) on the still image and supplies the difference to the target data size determining section 102.

In step S43, the target data size determining section 102 adds the difference in data size supplied from the resizing necessity judging section 104 to the data size difference integral value (D2). That is, the data size difference integral value (D2) is determined from the following Equation (3).

$$D2=D2+TargetSize-OriginalSize \quad (3)$$

Subsequently, the control proceeds to step S41, and the still image being processed is changed from the still image having undergone the resizing necessity judgment to the next still image. The processes in steps S36 to S43 described above are repeated.

That is, repeating the processes in steps S36 to S43 allows the resizing necessity judging section 104 to successively change the still image being processed, judge whether or not the still image being processed needs to be resized, and reserve a still image judged to be resized as an image to be resized, whereas holding link information on the still image judged not to be resized. Further, when the still image being processed is held in the form of link information, the target data size determining section 102 increases the data size difference integral value (D2), specifically, successively sums the data size obtained by subtracting the data size of original data (OriginalSize) on the still image having a data size smaller than the target data size (TargetSize) from the target data size (TargetSize).

The still image being processed is successively changed, and the resizing necessity judgment is made. When the result of the judgment in step S36 shows that all the still images selected by the user have been processed, the control proceeds to step S44. In step S44, the target data size determining section 102 judges whether or not the resize count (ResizeCount) is zero. When the result of the judgment shows ResizeCount=zero, no still image to be resized is present. The control therefore returns to the process in step S12 in FIG. 5, and the processes in step S13 and the following steps are carried out. In this case, all the still images are transferred in the form of original data to a destination receiver.

On the other hand, when the result of the judgment in step S44 shows that ResizeCount is not zero, the resizing necessity judgment, called first resizing necessity judgment in the following description, is completed, and the control proceeds to step S45 in FIG. 11.

In step S45, the target data size determining section 102 corrects the target data size (TargetSize) based on the result of the first resizing necessity judgment to determine a corrected target data size (TargetSize). The corrected target data size (TargetSize) is determined from the following Equation (4).

$$TargetSize=TargetSize+D2/ResizeCount \quad (4)$$

Figure 10:
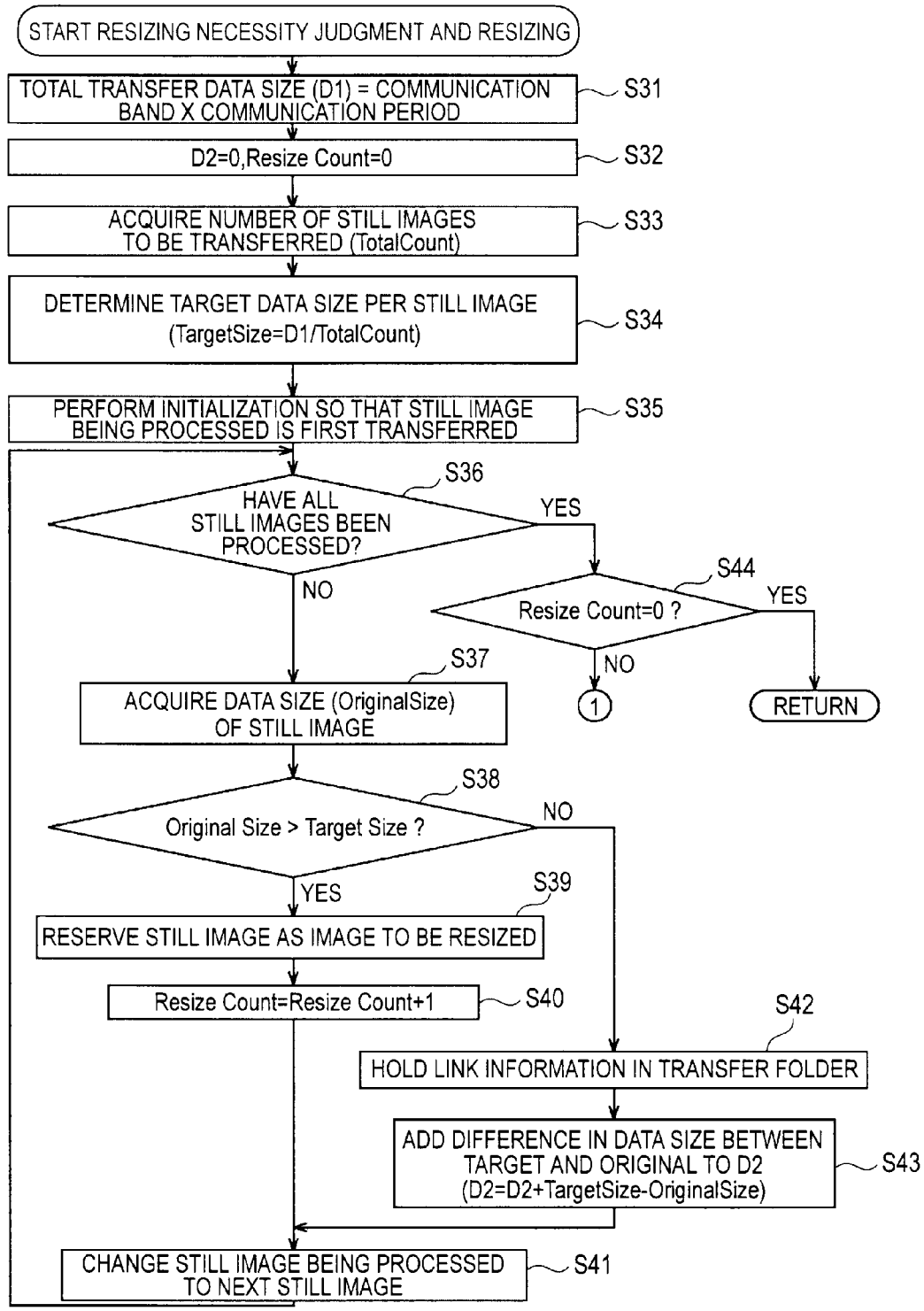
FIG. 10 is a flowchart for describing the resizing necessity judgment and the resizing in detail.

In Equation (4), D2 is the data size difference integral value determined in the process in step S43 in FIG. 10, and ResizeCount is a count determined in the process in step S40 in FIG. 10.

The corrected target data size (TargetSize) will now be described in detail with reference to FIG. 12.

Figure 12:
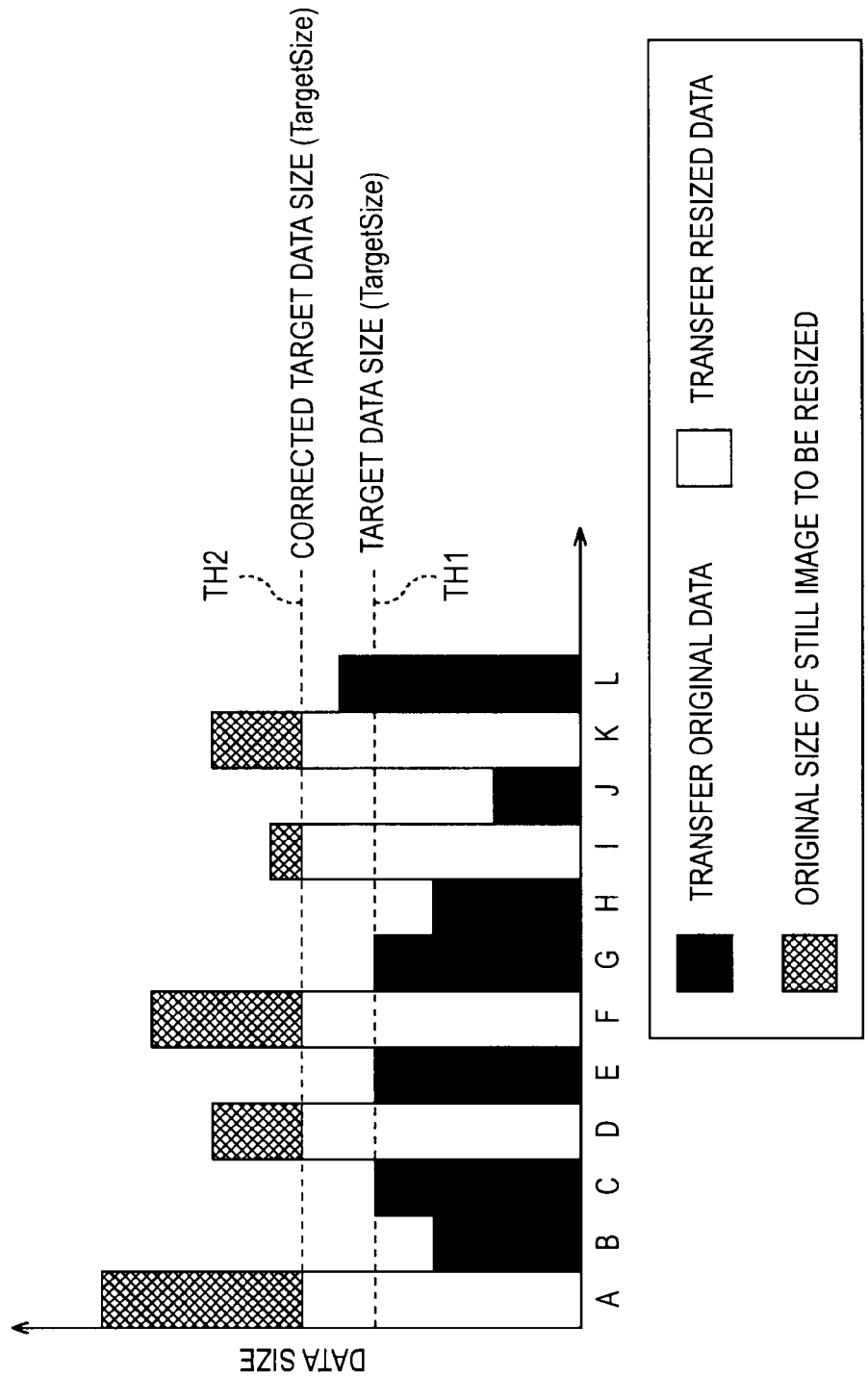
FIG. 12 describes a corrected target data size in detail.

In FIG. 12, the horizontal axis represents each still image being processed, and the vertical axis represents the data size of each still image. That is, FIG. 12 shows exemplary data sizes of 12 still images A to L. In FIG. 12, TH1 represents a target data size (TargetSize), and TH2 represents a target data size (TargetSize) obtained by correcting TH1.

That is, the target data size TH1 in FIG. 12 is the average data size of the still images A to L determined in the process in step S34 in FIG. 10 and serves as the judgment condition in the first resizing necessity judgment (process in step S38 in FIG. 10). In the example shown in FIG. 12, since the data sizes of the still images A, D, F, I, K, and L are greater than the target data size TH1, it is judged that resizing is necessary and these still images are reserved as those to be resized. On the other hand, since the data sizes of the still images B, C, E, G, H, and J are smaller than the target data size TH1, it is judged that resizing is unnecessary and link information on these still images is held.

The resize count (ResizeCount) and the data size difference integral value (D2) are determined in the first resizing necessity judgment as described above, and these values along with Equation (4) described above are used to correct the target data size (TargetSize) (process in step S45). That is, since the still images to be transferred include those having data sizes smaller than the target data size TH1, the resultant margin in the total transfer data size is reflected in the still images reserved as those to be resized. To this end, the data size corresponding to the margin (data size difference integral value (D2)) is distributed to the still images reserved as those to be resized in the first resizing necessity judgment.

In second resizing necessity judgment, which will be described later, in which the corrected target data size TH2 is used, it is judged that the still image L, for example, does not need to be resized, unlike it has been judged that the still image L needs to be resized when the target data size TH1 is used. As a result, the still image L is not resized but can be transferred in the form of original data and the link information thereon is held.

For the purpose described above, the corrected target data size (TargetSize) is determined and supplied to the resizing necessity judging section 104. The resizing necessity judging section 104 then uses the corrected target data size to make second resizing necessity judgment.

Figure 11:
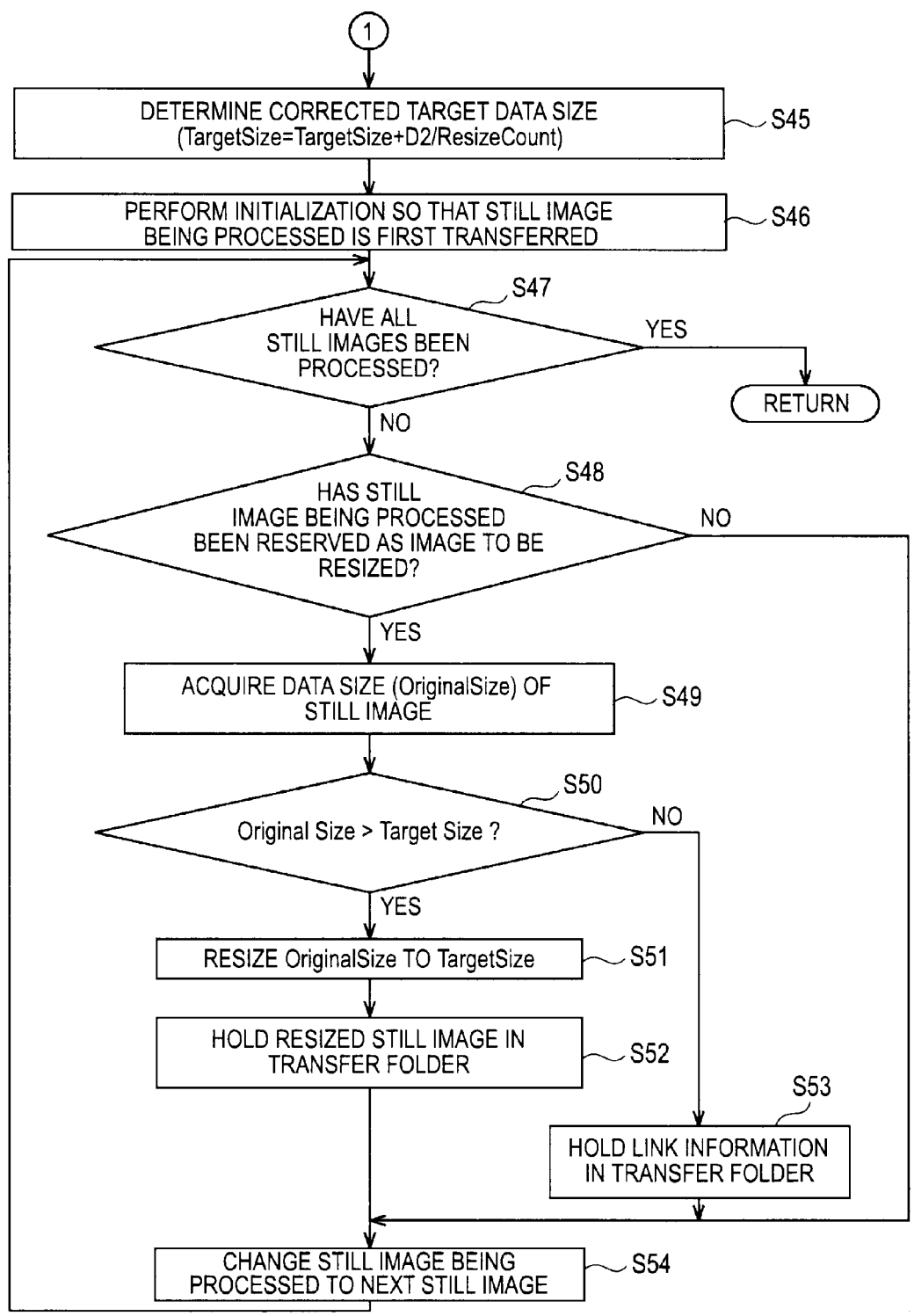
FIG. 11 is another flowchart for describing the resizing necessity judgment and the resizing in detail.

Referring back to the flowchart of FIG. 11, the image being processed is initialized in steps S46 and it is judged that all the still images have been processed in step S47, as in steps S35 and S36 in FIG. 10.

When the result of judgment in step S47 shows that all the still images have not been processed, the resizing necessity judging section 104 judges in step S48 whether or not the still image being processed has been reserved as an image to be resized in the process in step S39 in FIG. 10.

When the result of the judgment in step S48 shows that the still image being processed has not been reserved as an image to be resized, the processes in step S49 to S53 are skipped because no more resizing necessity judgment is necessary, and the control proceeds to step S54.

On the other hand, when the result of the judgment in step S48 shows that the still image being processed has been reserved as an image to be resized, the data size of original data (OriginalSize) of the still image is acquired in steps S49 and it is judged in step S50 that the acquired data size is greater than the corrected target data size (TargetSize) (TH2 in FIG. 12, for example), as in steps S37 and S38 in FIG. 10.

When the result of the judgment in step S50 shows that the data size (OriginalSize) of the still image is greater than the corrected target data size (TargetSize), the resizing necessity judging section 104 supplies the judgment result to the resizing processor 106. In step S51, the resizing processor 106 acquires original data on the still image being processed from the recording medium 43 based on the judgment result from the resizing necessity judging section 104 and resizes the data size of the original data (OriginalSize) to the corrected target data size (TargetSize).

In step S52, the resizing processor 106 supplies the still image resized data having been resized to the corrected target data size to the transfer folder 105, where the resized data is held.

On the other hand, when the result of the judgment in step S50 shows that the data size (OriginalSize) of the still image is smaller than or equal to the corrected target data size (TargetSize), the resizing necessity judging section 104 allows in step S53 the transfer folder 105 to hold the link information on the still image being processed, as in step S42 in FIG. 10.

When the process in steps S52 or S53 is completed, the control proceeds to step S54. In step S54, the still image being processed is changed from the still image having undergone the second resizing necessity judgment to the next still image. The control returns to step S47, and the processes in steps S47 to S54 described above are repeated.

That is, repeating steps S47 to S54 allows the resizing necessity judging section 104 to successively change the still image being processed and perform the second resizing necessity judgment on a still image having been reserved as an image to be resized in the first resizing necessity judgment. A still image judged to be resized also in the second resizing necessity judgment is resized to have the corrected target data size (TargetSize) and held in the form of resized data, whereas a still image judged not to be resized in the second resizing necessity judgment is held in the form of link information. For example, in the example shown in FIG. 12, the still images A, D, F, I, and K are resized to have the corrected target data size (TargetSize) and then held in the transfer folder 105, whereas the still images B, C, E, G, H, J, and L are held in the form of link information in the transfer folder 105.

Figure 13:
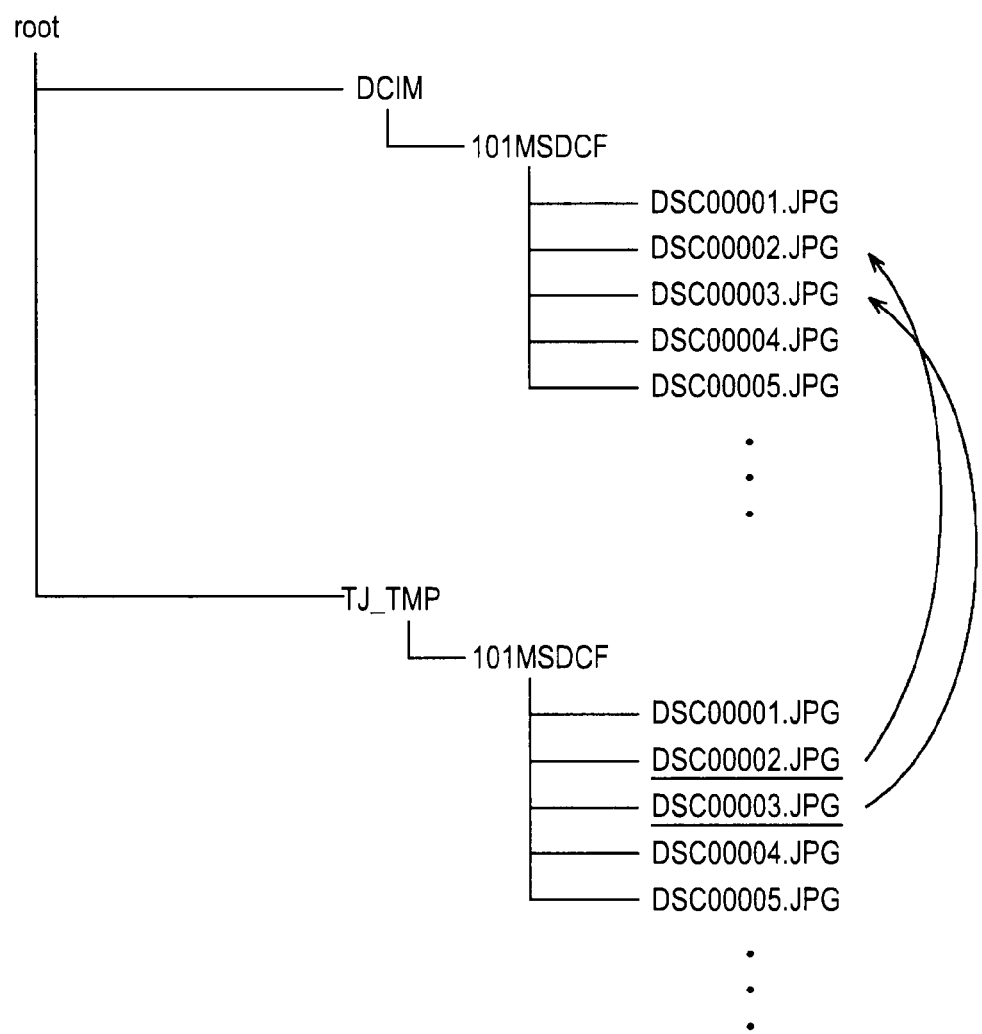
FIG. 13 diagrammatically shows an exemplary directory structure of transfer data.

FIG. 13 diagrammatically shows an exemplary directory structure of transfer data temporarily held in the transfer folder 105.

In the exemplary directory structure shown in FIG. 13, "root," "DCIM," "TJ_TMP," and "101MSDCF" represent folders, and characters with extensions, such as "DSC00001.JPG," "DSC00002.JPG," "DSC00003.JPG," "DSC00004.JPG," "DSC00005.JPG," and so on represent files in each of which a JPEG-compressed still image is stored. Further, among these files, each set of characters written in a typical solid line represents a file entity, and each set of characters written in a thick solid line and provided with an underline indicates that no file entity is present in the corresponding folder but link information representing a link to the file is present.

In the directory structure shown in FIG. 13, "root" represents the highest level of the hierarchy structure, and "DCIM" and "TJ_TMP" are directories lower than "root." "101MSDCF" in "DCIM" lower than "root" contains "DSC00001.JPG," "DSC00002.JPG," "DSC00003.JPG," "DSC00004.JPG," "DSC00005.JPG," and so on. "101MSDCF" in "TJ_TMP" lower than "root" contains "DSC00001.JPG," "DSC00002.JPG," "DSC00003.JPG," "DSC00004.JPG," "DSC00005.JPG," and so on.

"DCIM" corresponds to a folder that stores original data on still images recorded on the recording medium 43, and all the files located in the folder are entity original data.

"TJ_TMP" corresponds to the transfer folder 105 (an area in the memory 31A, for example) for temporarily holding transfer data (link information and resized data) before the transfer data is transferred to a destination receiver. Among the files located in "101MSDCF" in "TJ_TMP," "DSC00001.JPG," "DSC00004.JPG," and "DSC00005.JPG" are entity resized data, and "DSC00002.JPG" and "DSC00003.JPG" are link information related to original data located in "101MSDCF" in "DCIM." In the example shown in FIG. 13, "DSC00002.JPG" in "101MSDCF" in "TJ_TMP" is related to "DSC00002.JPG" in "101MSDCF" in "DCIM," and "DSC00003.JPG" in "101MSDCF" in "TJ_TMP" is related to "DSC00003.JPG" in "101MSDCF" in "DCIM."

At the time of transfer under the directory structure described above, the files temporarily held in "TJ_TMP" (transfer folder 105) are transferred, and "DSC00002.JPG" and "DSC00003.JPG" stored link information are so handled that entity files (original data) related thereto are read and the original data on the entities are transferred.

Since no entity original data is stored in "101MSDCF" in "TJ_TMP," which is the transfer folder 105, as described above, the period in which original data in "101MSDCF" in "DCIM" is copied to "101MSDCF" in "TJ_TMP" at the time of transfer can be omitted.

The description now returns to the flowchart of FIG. 11. When it is judged that all the still images have been processed ("Yes" in step S47), the control returns to step S12 in FIG. 5, and the processes in step S13 and the following steps are carried out. In this case, when the transfer data in the transfer folder 105 is ready for TJ communication with a destination receiver, the transfer data is transferred to the destination receiver.

As described above, in the digital still camera 1, after a target data size in accordance with which transfer data is transferred in a predetermined fixed period is determined, and a still image having a data size greater than the determined target data size is resized, the resultant transfer data is then transferred, whereby any transfer data can be transferred in the fixed period and hence the transfer period can be reduced. Further, when still images are transferred between apparatus, the transfer is completed in a fixed period without fail even when the data size of each still image or the number of still images increases. As a result, the period during which the user should wait until image transfer is completed can be shorter than a certain period, whereby user convenience can be improved.

For example, when a still image is transferred through TJ communication or any other near field communication, it is necessary not only to bring the digital still camera 1, which is a source, and the digital still camera 2, which is a destination, close to each other to some extent but also to maintain the cameras close to each other while the communication is established, as shown in FIG. 1. In this case, the user typically maintains the digital still cameras 1 and 2 close to each other by holding the cameras in hand. Therefore, completing still image transfer in a fixed period, such as five to ten seconds, eliminates a problem of forcing the user to wait for a long time while holding the digital still cameras in hand.

Further, since a data size difference integral value obtained in the first resizing necessity judgment is used to first correct a target data size and then perform the second resizing necessity judgment to finally determine a still image to be resized, a still image having a largest transferable data size can be transferred without any compromise on user convenience.

<2. Second Embodiment>

A second embodiment of the invention will next be described with reference to FIGS. 14 to 17.

[Exemplary Functional Configuration of Digital Still Camera]

Figure 14:
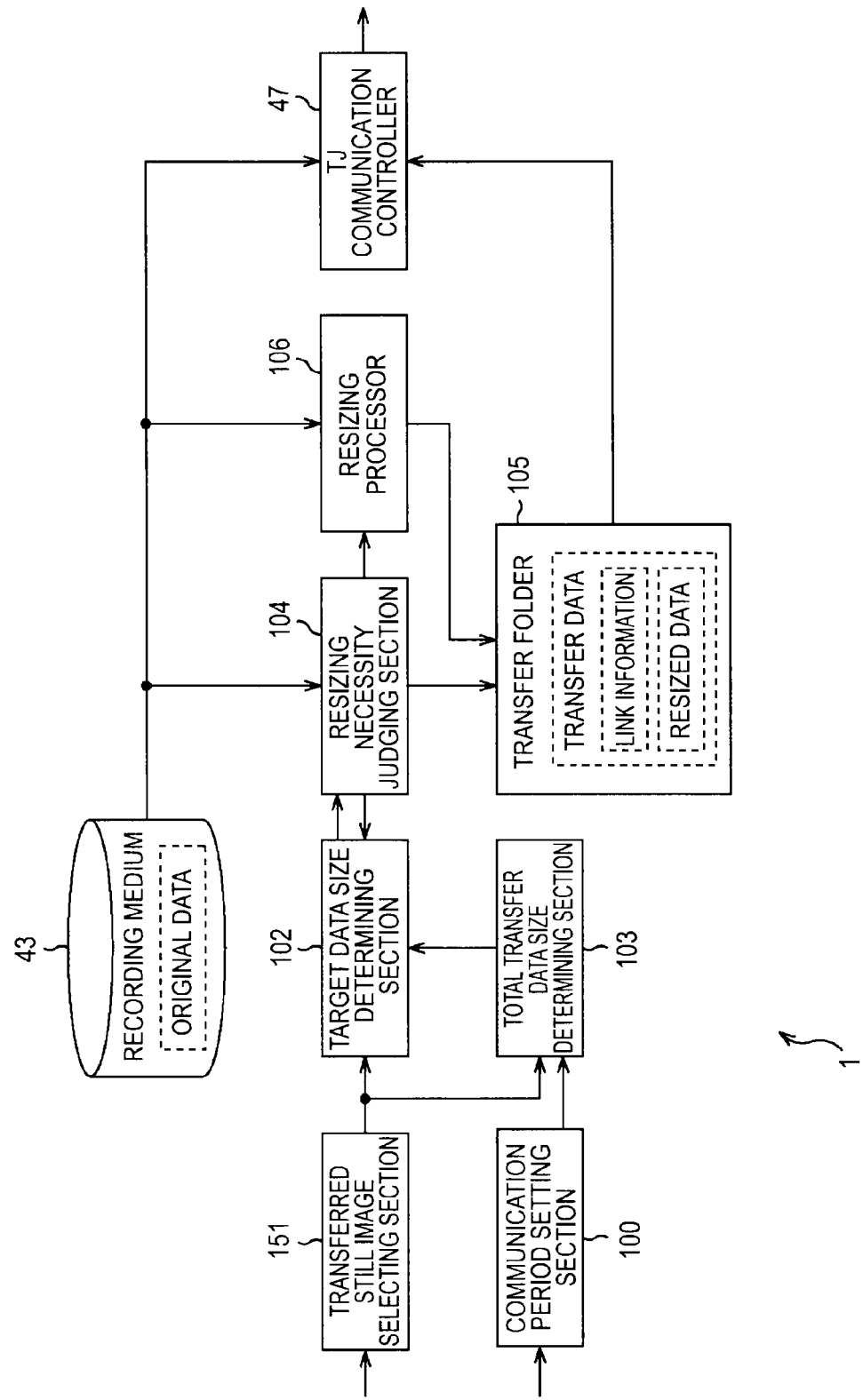
FIG. 14 shows another exemplary functional configuration of the digital still camera.

FIG. 14 shows another exemplary functional configuration of the digital still camera 1 shown in FIG. 4. The digital still camera 1 (second embodiment) shown in FIG. 14 differs from the digital still camera 1 (first embodiment) shown in FIG. 4 in that the transferred still image selecting section 101 is replaced with a transferred still image selecting section 151.

The transferred still image selecting section 151 choose a still image to be transferred or a still image to be transferred in the form of original data in accordance with user's operation. The transferred still image selecting section 151 supplies the selection result to the target data size determining section 102 or the total transfer data size determining section 103.

The total transfer data size determining section 103 changes the total transfer data size based on the selection result from the transferred still image selecting section 151 and supplies the result to the target data size determining section 102. The target data size determining section 102 thus determines (corrects) a target data size according to the selection result from the transferred still image selecting section 151.

In FIG. 14, the same portions as those in FIG. 4 have the same reference characters, and portions where the same processes are carried out will not be repeatedly described.

[Still Image Transfer]

Still image transfer performed by the digital still camera 1 shown in FIG. 14 will next be described with reference to the flowchart of FIG. 15.

In step S71, the transferred still image selecting section 151 selects still images to be transferred in accordance with user's operation, as in step S11 in FIG. 5. That is, still images to be transferred in TJ communication are selected along the same screen transition as that described with reference to FIGS. 6A to 6C.

In step S72, the target data size determining section 102 makes first resizing necessity judgment and the resizing processor 106 performs resizing, as in step S12 in FIG. 5. The resizing necessity judgment and the resizing are the same as those described with reference to the flowcharts of FIGS. 10 and 11. The display section 14 displays "Transfer preparation in progress" shown in FIG. 8 or any other message while the resizing necessity judgment and the resizing are being performed.

In step S73, the transferred still image selecting section 151 judges whether or not the user wants to change a still image to be transferred in the form of original data. That is, since a still image judged to be resized in the resizing necessity judgment (process in step S72) has been automatically judged so by the digital still camera 1 based on the target data size irrespective of user's decision, the still image judged so may not be a still image that the user desires to transfer in the form of original data. In the present embodiment, the user is allowed before transferring transfer data to select a still image that the user wants to transfer in the form of original data instead of resized data.

When it is judged in step S73 that the user wants to change a still image to be transferred in the form of original data, the transferred still image selecting section 151 changes in step S74 the still image to be transferred in the form of original data in accordance with user's operation. When the process in step S74 is completed, the control returns to step S72. In step S72, second resizing necessity judgment is made and resizing is performed again under the condition that the still image to be transferred in the form of original data has been changed.

FIGS. 16A to 16E diagrammatically show a series of screens for reselecting an image to be transferred. The screens shown in FIGS. 16A to 16E are displayed in the display section 14 under the control of the display controller 44.

Figure 16A:
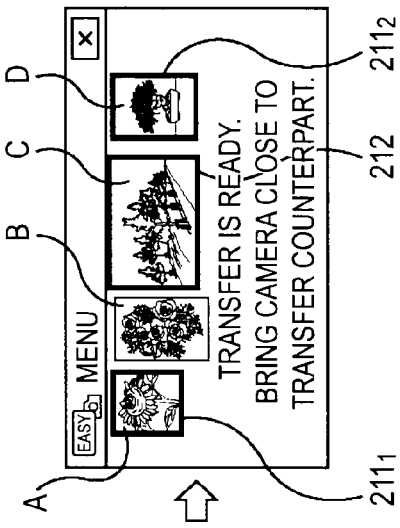
FIGS. 16A to 16E diagrammatically show a series of screens for reselecting an image to be transferred.
Figure 16B:
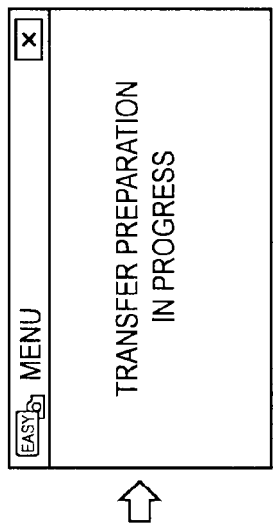

The screen shown in FIG. 16A is displayed after the first resizing necessity judgment and resizing (processes in step S72 in FIG. 15) are completed. Four still images are displayed in the form of thumbnail image on the screen shown in FIG.

16A. A still image A and a still image C, first and third still images from the left, surrounded by thick frames $211_1$ and $211_2$ are those judged to be resized. When the user wants to transfer, for example, the still image C surrounded by the thick frame $211_2$ in the form of original data instead of resized data, the user specifies the still image C as a still image that the user wants to transfer in the form of original data (processes in steps S73 and S74 in FIG. 15). Thereafter, the second resizing necessity judgment is made and the resizing is performed (processes in step S72 shown in FIG. 15), and the display section 14 displays "Transfer preparation in progress" shown in FIG. 16B or any other message.

Figure 16C:
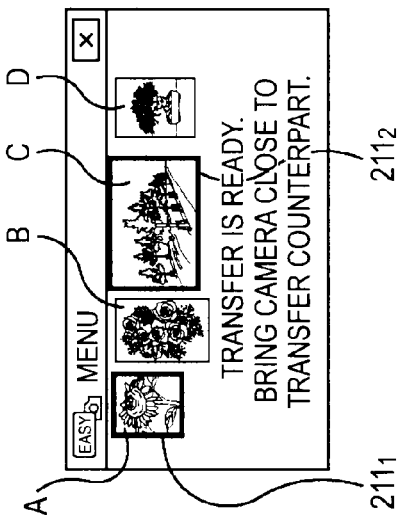
Figure 16D:
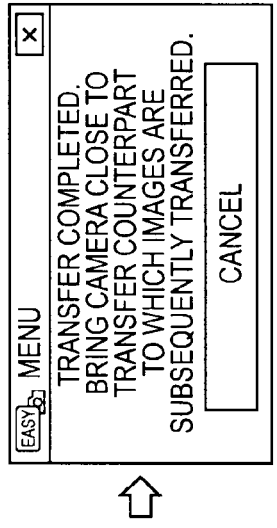
Figure 16E:
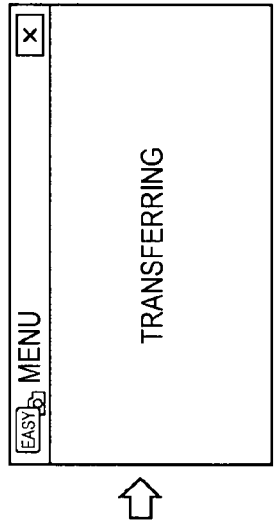

When the second resizing necessity judgment and resizing are completed, the display section 14 displays the screen shown in FIG. 16C. The four still images are displayed on the screen shown in FIG. 16C, as in the case of the screen displayed when the first resizing necessity judgment and resizing are completed (screen shown in FIG. 16A). The still images A and D, the first and fourth still images from the left, are surrounded by the thick frames $211_1$ and $211_2$, and the still image C, the third still image from the left, is surrounded by a thick frame 212. That is, the still image C surrounded by the thick frame 212 represents a still image to be transferred in the form of original data instead of resized data in accordance with the user's operation. On the other hand, the still image D newly surrounded by the thick frame $211_2$ represents a still image to be transferred in the form of resized data because the user has decided to transfer the still image C in the form of original data.

The screen shown in FIG. 16C has been described with reference to the case where a still image to be transferred in the form of resized data is changed to a still image to be transferred in the form of original data. Conversely, a still image to be transferred in the form of original data can be changed to a still image to be transferred in the form of resized data.

Referring back to the flowchart of FIG. 15, when it is judged in step S73 that the user does not want to change a still image to be transferred in the form of original data, the control proceeds to step S75.

In steps S75 to S79, when the TJ communication controller 47 is ready for TJ communication with a destination receiver, TJ communication is established with the destination receiver and original data corresponding to link information held in the transfer folder 105 and resized data are transferred as transfer data, as in steps S13 to S17 in FIG. 5. After the TJ communication is established and the transfer data starts being transferred (processes in steps S75 and S76 in FIG. 15), the display section 14 displays "Transferring" shown in FIG. 16D or any other message. Further, in step S78 in FIG. 15, in which it is judged whether or not the transfer data is transferred to another receiver, the screen shown in FIG. 16E, for example, is displayed, as in step S16 in FIG. 5.

The digital still camera 1 shown in FIG. 14 performs still image transfer as described above.

[Details of Resizing Necessity Judgment and Resizing]

Figure 17:
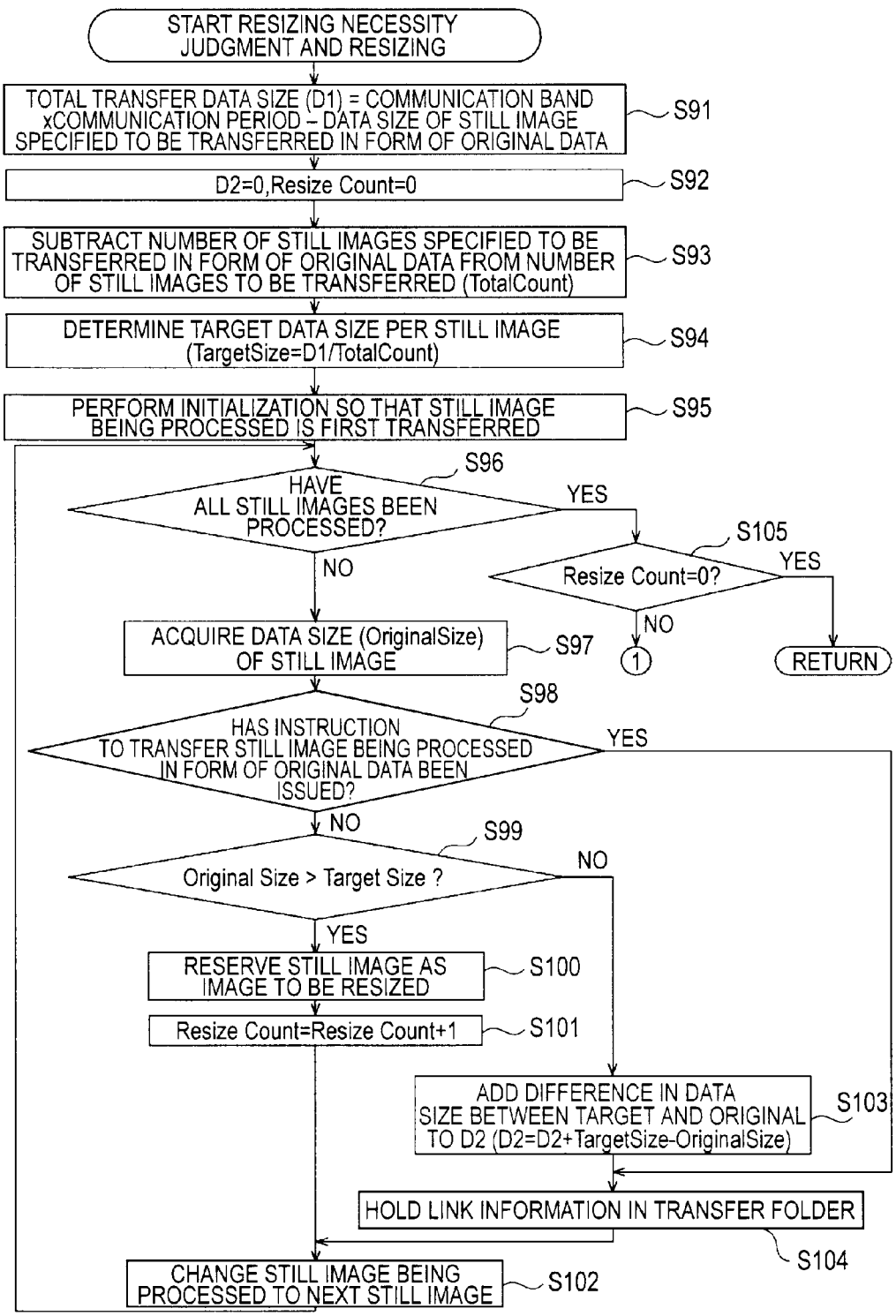
FIG. 17 is a flowchart for describing the resizing necessity judgment and the resizing in detail.

The resizing necessity judgment and the resizing in the second embodiment corresponding to step S72 in FIG. 15 will next be described with reference to the flowchart of FIG. 17. The flowchart of FIG. 17 shows the second resizing necessity judgment and resizing after the selection of a still image to be transferred in the form of original data (process in step S74 in FIG. 15).

In step S91, the total transfer data size determining section 103 changes the total transfer data size (D1) based on the selection result from the transferred still image selecting section 151 and supplies the result to the target data size determining section 102. The total transfer data size (D1) is determined from the following Equation (5).

$$D1 = \text{communication band} \times \text{communication period} - \text{data size of still image specified to be transferred in the form of original data} \quad (5)$$

In Equation (5), the "data size of still image specified to be transferred in the form of original data" is the data size of a still image to be transferred in the form of original data selected in the process in step S74 in FIG. 15 described above. That is, the resizing necessity judgment is made except a still image specified by the user to be transferred in the form of original data.

In step S92, the target data size determining section 102 sets initial D2 and ResizeCount values, as in step S32 in FIG. 10.

In step S93, the target data size determining section 102 determines the number of still images to be transferred (Total-Count) from the following Equation (6) in consideration of the still image specified to be transferred in the form of original data.

$$\begin{aligned}\text{Number of still images to be transferred (TotalCount)}\\ = \text{number of still images to be transferred (Total-} \\ \text{Count)} - \text{number of still images specified to be} \\ \text{transferred in the form of original data} \quad (6)\end{aligned}$$

In step S94, the target data size determining section 102 computes Equation (2) to determine and correct the target data size (TargetSize) per still image, as in step S34 in FIG. 10.

That is, the target data size (TargetSize) is the data size of a single still image to be transferred with respect to the total transfer data size (D1) of the still images the number of which is obtained by subtracting the number of still images specified to be transferred in the form of original data from TotalCount, i.e., Equation (6).

In steps S95 to S105 in FIG. 17, the first resizing necessity judgment is made as in steps S35 to S44 in FIG. 10, but the process in step S98 is added to the flowchart of FIG. 17. That is, the resizing necessity judging section 104 judges in step S98 whether or not an instruction to transfer the still image being processed in the form of original data has been issued.

When it is judged that no instruction to transfer the still image being processed in the form of original data has been issued ("No" in step S98), the control proceeds to step S99, and the processes in steps S99 to S104 are carried out. That is, in steps S99 to S104, the resizing necessity judging section 104 successively changes the still image being processed, judges whether or not the still image being processed needs to be resized, and reserves a still image judged to be resized as an image to be resized (process in step S100), whereas holding link information on a still image judged not to be resized (process in step S104), as in steps S38 to S43 in FIG. 10. Further, when the still image being processed is held in the form of link information, the target data size determining section 102 increases the data size difference integral value (D2), specifically, successively sums the data size obtained by subtracting the data size (OriginalSize) of the still image having a data size smaller than the target data size (Target-Size) from the target data size (TargetSize) (process in step S103).

On the other hand, when it is judged that an instruction to transfer the still image being processed in the form of original data has been issued ("Yes" in step S98), the control proceeds to step S104. The resizing necessity judging section 104 allows the transfer folder 105 to hold link information on the still image being processed and having specified to be transferred in the form of original data. That is, since the still image specified to be transferred in the form of original data is not resized but is transferred in the form of original data, the link information thereon is forcibly held in the transfer folder 105.

As described above, after the resizing necessity judgment is made and all the still images are processed, the control proceeds to step S105. Step S105 corresponds to step S44 in FIG. 10, and the processes after step 105 are the same as those after step S44 (processes in flowchart of FIG. 11) described above. That is, in the second resizing necessity judgment and resizing, after the data size difference integral value obtained in the first resizing necessity judgment is used to further correct the target data size, the second resizing necessity judgment is made, and a still image having been judged to be resized is resized.

As described above, in the digital still camera 1 of the present embodiment, not only can any transfer data be transferred in a fixed period so that the period during which the user should wait until image transfer is completed be shorter than a certain period but also the user can select a still image that the user wants to transfer in the form of original data, for example, a user's favorite still image can be transferred in the form of original data. As a result, a desired still image can be transferred in the form of high-definition image, whereby the user convenience can be further improved.

<3. Variations>

The above description has been made with reference to the digital still camera 1, and the invention is, for example, also applicable not only to a mobile phone, a game console, and other apparatus including image capturing means but also to a personal computer and other apparatus capable of transferring data to a destination receiver. The destination apparatus is not limited to the digital still camera 2 but can be a personal computer, to which a still image is transferred. Further, the above description has been made with reference to a still image, and the invention is also applicable, for example, to moving pictures and audio data. When the invention is applied to moving pictures, not only can the image size be changed as in the case of a still image but also the codec format can be converted and the compression ratio can be increased to reduce the amount of codes while the image size is maintained.

Moreover, the above description has been made with reference to the case where a user selects a still image to be transferred. A still image to be transferred is arbitrarily determined, for example, all still images recorded on the recording medium 43 may be those to be transferred, and still images with the same date stamp may be those to be transferred. Further, a still image to be resized may be determined, for example, by using Exif information or meta data attached to a still image or information obtained when predetermined image processing is performed on a still image.

The screens shown in FIGS. 6A to 6C, 8, 9A to 9C, and 16A to 16E are presented by way of example of the configuration of the screens when a still image is transferred. The layout and the aspect ratios of the screens may, of course, differ from those shown in the drawings. For example, the screens may have the following information: how many seconds the transfer will take when all still images are transferred in the form of original data without any resizing necessity judgment and resizing performed on the still images to be transferred or how many still images can be transferred in the form of original data in a fixed period, such as five seconds.

The above description has been made with reference to TJ communication as an example of near field communication between apparatus. Other communication methods can, of course, be employed.

The TJ communication will now be described in detail. The TJ communication enables high-speed data transfer at a maximum throughput of 560 Mbps or an effective throughput of 375 Mbps. In the TJ communication, a maximum operable distance is several centimeters, and the network topology may be always point-to-point (abbreviated as P-P). The distance between apparatus and the network topology thereof described above make the communication system significantly simple. Since the distance between apparatus is short, the TJ communication is characterized in that a near-range wireless signal can be manipulated by very small transmission electric power smaller than or equal to −70 dBm/MHz. Since a P-P network topology is employed, network setting and management can be advantageously greatly simplified.

Since near field communication does not involve polarized light, the connection can be well established even when the two apparatus are not precisely aligned. TJ communication uses a spectrum band of 560 MHz around 4.48 GHz. The spectrum and the very low transfer electric power described above make the TJ communication require no approval in Japan, European countries, USA, and other countries where communication regulations are enforced. TJ communication is also characterized by a robust protocol including error detection/correction and packet recognition/retransmission. All the features described above minimize complication of the communication system and interference therein. In addition to these features, the low transmission electric power and the P-P topology serve to reduce power consumption. An apparatus that supports TJ communication detects others only when they enter a communicable range of the apparatus. Power consumption can therefore be reduced because transmission occurs only when another apparatus is detected, which is another advantage of a touch model.

In the TJ communication, three layers, that is, a PCL (Protocol Conversion Layer), a CNL (Connection Layer), and a PHY (Physical Layer), are defined to fulfill the principles described above. The physical layer (PHY) establishes actual wireless communication. The layer converts digital information into an RF signal suitable for communication with a TransferJet coupler. The connection layer (CNL) manages the connection and data distribution. In the connection management, CNL is responsible for establishing and disconnecting connection with an apparatus that supports TJ communication, which is a communication counterpart. In the data distribution, CNL provides packets that transport data payload and checks if the packets have been successfully distributed to the counterpart device.

In the present specification, the steps written in a program stored on a recording medium include not only processes carried out in time series along the written order but also processes that are not necessarily carried out in time series but are carried out concurrently or individually.

Embodiments of the invention are not limited to those described above, but a variety of changes can be made to the extent that they do not depart from the substance of the invention.

The present application contains subject matter related to that disclosed in Japanese Priority Patent Application JP 2010-079188 filed in the Japan Patent Office on Mar. 30, 2010, the entire contents of which is hereby incorporated by reference.

What is claimed is:

1. An imaging transmission apparatus comprising:
   selection processing circuitry configured to select transmission data to be transmitted to a destination apparatus;

setting processing circuitry configured to set a transmission target period during which the selected transmission data is transmitted;

control processing circuitry configured to resize the transmission data in such a way that the size thereof becomes smaller than or equal to a total transfer data size of the transmission data, the total transfer data size determined based on the transmission target period;

display control processing circuitry configured to control display of transmission information on the transmission data resized by the control processing circuitry on a screen; and transmission processing circuitry configured to transmit the transmission data resized by the control processing circuitry to the destination apparatus.

2. The imaging transmission apparatus according to claim 1, further comprising:

determination processing circuitry configured to determine a target data size to which each set of data contained in the transmission data is resized based on the total transfer data size, wherein the control processing circuitry is configured to resize original data in the transmission data that is greater than the determined target data size in such a way that the resized data size becomes smaller than or equal to the target data size, the display control processing circuitry is configured to display, as the transmission information on the screen, information on original data in the transmission data that is smaller than or equal to the determined target data size and information on the resized data obtained by the resizing, and the transmission processing circuitry is configured to transmit the resized data obtained by the resizing along with the original data in the transmission data that is smaller than or equal to the determined target data size to the destination apparatus.

3. The imaging transmission apparatus according to claim 2, wherein the display control processing circuitry is configured to display, as the transmission information, transmission images corresponding to transmission data to be transmitted in the form of original data and transmission data to be transmitted in the form of resized data on the screen, the selection processing circuitry is configured to select the transmission data not to be resized but to be transmitted in the form of original data from original data in the transmission data that are greater than the target data size based on user's instruction performed on the transmission images displayed on the screen, the determination processing circuitry is configured to correct the target data size based on the data size of original data of the selected transmission data, and the control processing circuitry is configured to resize original data in the transmission data that are greater than the target data size corrected based on the data size of the original data of the selected transmission data in such a way that the data sizes of the original data become smaller than or equal to the corrected target data size.

4. The imaging transmission apparatus according to claim 3, wherein the transmission processing circuitry is configured to transmit, when being ready for near field communication with the destination apparatus, the transmission data to the destination apparatus through the near field communication.

5. The imaging transmission apparatus according to claim 4, wherein the display control processing circuitry is configured to display a message on the screen while the control processing circuitry is performing the resizing, the massage indicating that transmission preparation is in progress.

6. The imaging transmission apparatus according to claim 5, wherein the display control processing circuitry is configured to display a message on the screen when the control processing circuitry completes the resizing and the transmission preparation is made, the message prompting the user to bring the transmission apparatus close to the destination apparatus so that the near field communication is established.

7. The imaging transmission apparatus according to claim 6, wherein the display control processing circuitry is configured to display a message on the screen when the transmission processing circuitry starts the near field communication, the message indicating that the transmission is being performed.

8. The imaging transmission apparatus according to claim 7, wherein the display control processing circuitry is configured to display a message on the screen when the transmission processing circuitry completes the near field communication, the message indicating that the transmission is completed.

9. The imaging transmission apparatus according to claim 1, further comprising:

imaging processing circuitry configured to capture an image of a subject, wherein the transmission data is data on still images captured by the imaging processing circuitry.

10. The imaging transmission apparatus according to claim 4, wherein the near field communication complies with TransferJet standards.

11. A transmission method used with a transmission apparatus, the method comprising the steps of:

selecting transmission data to be transmitted to a destination apparatus;

setting a transmission target period during which the selected transmission data is transmitted;

resizing the transmission data in such a way that the size thereof becomes smaller than or equal to a total transfer data size of the transmission data, the total transfer data size determined based on the transmission target period;

controlling display of transmission information on the resized transmission data on a screen; and transmitting the resized transmission data to the destination apparatus.

12. A non-transitory computer readable medium storing a program, which when executed by a computer, causes the computer to perform a transmission method, the transmission method comprising:

selecting transmission data to be transmitted to a destination apparatus;

setting a transmission target period during which the selected transmission data is transmitted;

resizing the transmission data in such a way that the size thereof becomes smaller than or equal to a total transfer data size of the transmission data, the total transfer data size determined based on the transmission target period;

controlling display of transmission information on the transmission data resized in the resizing on a screen; and transmitting the transmission data resized in the resizing to the destination apparatus.

13. A transmission apparatus comprising:

selection means for selecting transmission data to be transmitted to a destination apparatus;

setting means for setting a transmission target period during which the selected transmission data is transmitted;

control means for resizing the transmission data in such a way that the size thereof becomes smaller than or equal to a total transfer data size of the transmission data, the total transfer data size determined based on the transmission target period;

display control means for controlling display of transmission information on the transmission data resized by the control means on a screen; and transmission means for transmitting the transmission data resized by the control means to the destination apparatus.

\* \* \* \* \*